(12) United States Patent
Yasuie et al.

(10) Patent No.: US 8,554,904 B2
(45) Date of Patent: Oct. 8, 2013

(54) ABNORMAL POINT LOCATING APPARATUS, METHOD, AND STORAGE MEDIUM

(75) Inventors: Takeshi Yasuie, Kawasaki (JP); Yuji Nomura, Kawasaki (JP); Taichi Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 660 days.

(21) Appl. No.: 12/689,963

(22) Filed: Jan. 19, 2010

(65) Prior Publication Data

US 2010/0185762 A1 Jul. 22, 2010

(30) Foreign Application Priority Data

Jan. 20, 2009 (JP) ................... 2009-010279

(51) Int. Cl.
*G06F 15/173* (2006.01)
(52) U.S. Cl.
USPC ............................ 709/224; 709/225; 709/226
(58) Field of Classification Search
USPC .................... 709/224–226; 370/394, 389
See application file for complete search history.

(56) References Cited

U.S. PATENT DOCUMENTS 7,313,141 B2 * 12/2007 Kan et al. ...................... 370/394
7,937,164 B2 * 5/2011 Samardzija et al. .......... 700/28
2006/0190620 A1 8/2006 Kobayashi
2007/0286069 A1 * 12/2007 Xu ................................ 370/218
2010/0100768 A1 4/2010 Yamamoto et al.

FOREIGN PATENT DOCUMENTS

JP 2006-229421 A 8/2006
JP 2006-238052 A 9/2006
WO WO-2009-004701 A1 1/2009

OTHER PUBLICATIONS

NTT DoCoMo, Inc and Fujitsu Limited, "DoCoMo & Fujitsu Develop Counter-Failure Technologies for IP Networks", Dec. 16, 2009, pp. 1-4, Tokyo, Japan. www.fujitsu.com/news/pr/archives/month/2009/20091216-02.html, retrieved May 16, 2013.

* cited by examiner

*Primary Examiner* — Minh-Chau Nguyen
(74) *Attorney, Agent, or Firm* — Fujitsu Patent Center

(57) ABSTRACT

An abnormal point locating method includes: a link primary abnormality judgment procedure that acquires information on a link through which each observation flow passes, locates a link through which an observation flow observed at an observation point passes, and judges whether the located link is normal or abnormal based on the observation flow; and a link secondary abnormality judgment procedure that judges a probability of abnormality based on a result of the link primary abnormality judgment procedure by using a connection relationship as seen from each observation point.

17 Claims, 24 Drawing Sheets

FIG. 2

| OBSERVATION FLOW | | OBSERVATION FLOW PASSAGE LINK | | | | | | | | | | | |
|---|---|---|---|---|---|---|---|---|---|---|---|---|---|
| SOURCE INFORMATION (SOURCE OBSERVATION POINT) | DESTINATION INFORMATION (OPPOSED OBSERVATION POINT) | 1 | 2 | 3 | 4 | 5 | 6 | 7 | 8 | 9 | 10 | 11 | 12 |
| A | B | × | | | | | | | | | | | |
| A | D | × | | × | | | × | | | | | | × |
| A | E | × | × | | × | | | | | | | | |
| B | A | × | | × | × | × | | | | | | | |
| B | C | | × | × | | × | | | | | | | |
| B | D | | | × | × | × | × | | | × | | | × |
| B | E | | × | × | × | × | | | × | | | | |
| C | B | | | | | | | | × | × | | | |
| D | A | × | | × | | | | | | × | × | | × |
| D | B | × | | | × | | | | | | | × | × |
| E | A | | | × | × | | | | | × | × | | |
| E | B | | × | × | × | | | | | × | | | |

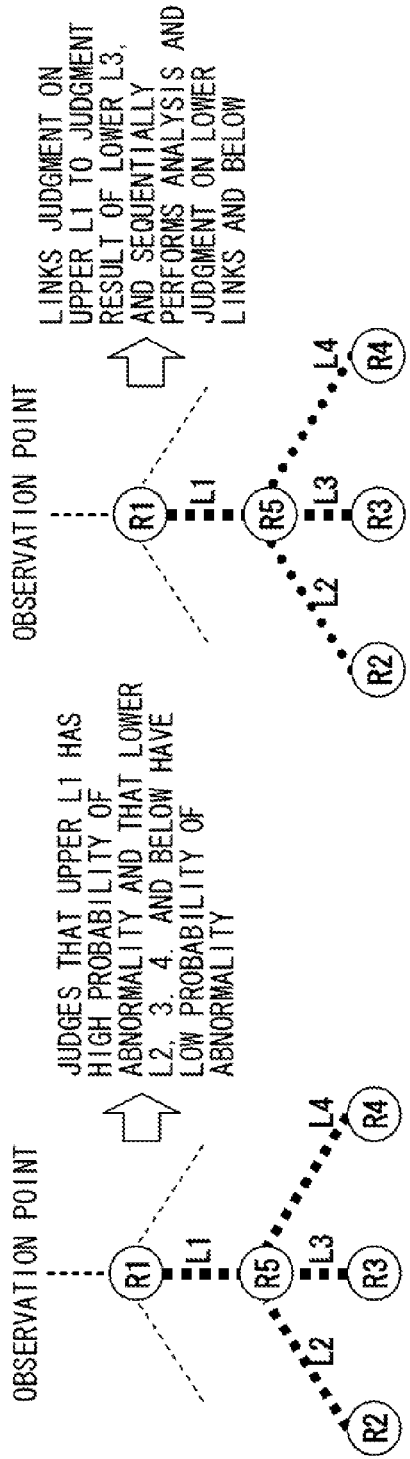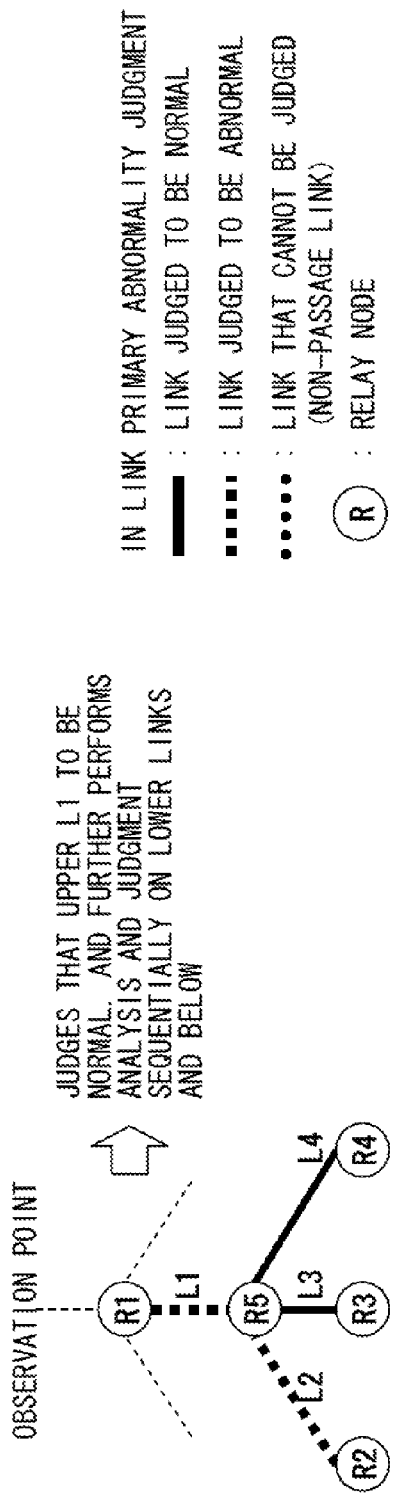

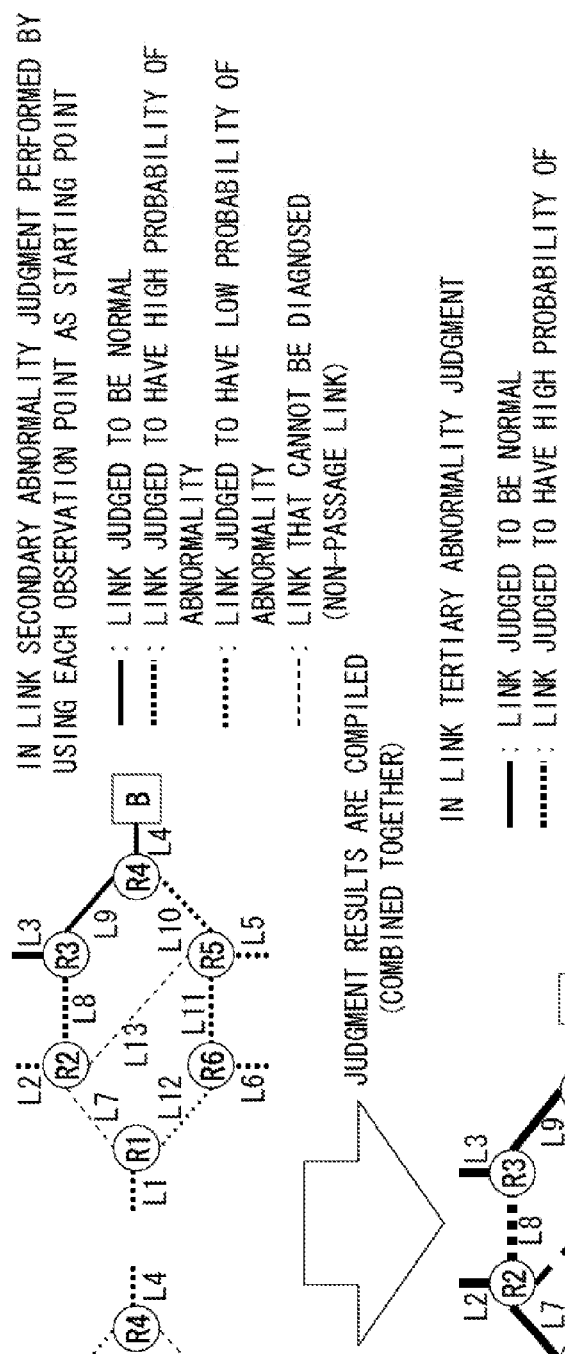

FIG. 4A  FIG. 4B

IN LINK SECONDARY ABNORMALITY JUDGMENT PERFORMED BY USING EACH OBSERVATION POINT AS STARTING POINT

──── : LINK JUDGED TO BE NORMAL
▪▪▪▪ : LINK JUDGED TO HAVE HIGH PROBABILITY OF ABNORMALITY
┈┈┈ : LINK JUDGED TO HAVE LOW PROBABILITY OF ABNORMALITY
- - - : LINK THAT CANNOT BE DIAGNOSED (NON-PASSAGE LINK)

JUDGMENT RESULTS ARE COMPILED (COMBINED TOGETHER)

FIG. 4C

IN LINK TERTIARY ABNORMALITY JUDGMENT

──── : LINK JUDGED TO BE NORMAL
▪▪▪▪ : LINK JUDGED TO HAVE HIGH PROBABILITY OF ABNORMALITY
┈┈┈ : LINK JUDGED TO HAVE LOW PROBABILITY OF ABNORMALITY
- - - : LINK THAT CANNOT BE DIAGNOSED (NON-PASSAGE LINK)

LINK TERTIARY ABNORMALITY JUDGMENT RESULT

JUDGES THAT L8, 10, AND 12 ARE LINKS HAVING HIGH PROBABILITY OF ABNORMALITY
JUDGES THAT L5, 6, AND 11 ARE LINKS HAVING LOW PROBABILITY OF ABNORMALITY
JUDGES THAT L1, 2, 3, 4, 7, AND 9 ARE NORMAL LINKS
(JUDGES THAT L13 IS LINK THAT CANNOT BE DIAGNOSED)

FIG. 7

| SOURCE INFORMATION (SOURCE OBSERVATION POINT) | DESTINATION INFORMATION (OPPOSED OBSERVATION POINT) | QUALITY INFORMATION (PACKET LOSS RATE) |
|---|---|---|
| A | B | 3.0 |
| A | C | 0.0 |
| A | D | 1.5 |
| A | E | 1.2 |
| ⋮ | ⋮ | ⋮ |
| E | B | 2.8 |
| E | C | 0.0 |
| E | D | 0.0 |

FIG. 8

| SOURCE INFORMATION (SOURCE OBSERVATION POINT) | DESTINATION INFORMATION (OPPOSED OBSERVATION POINT) | PASSAGE PATH INFORMATION |
|---|---|---|
| A | B | A→R1→R2→B |
| A | C | A→R1→R2→R5→C |
| A | D | A→R1→R3→R4→R6→D |
| A | E | A→R1→R3→E |
| ⋮ | ⋮ | ⋮ |
| E | B | E→R3→R1→R2→B |
| E | C | E→R3→R4→R5→C |
| E | D | E→R3→R4→R6→D |

FIG. 9

| SOURCE INFORMATION (SOURCE OBSERVATION POINT) | DESTINATION INFORMATION (OPPOSED OBSERVATION POINT) | QUALITY INFORMATION (PACKET LOSS RATE) | FLOW ABNORMALITY JUDGMENT RESULTS |
|---|---|---|---|
| A | B | 3.0 | ABNORMAL |
| A | C | 0.0 | NORMAL |
| A | D | 1.5 | ABNORMAL |
| A | E | 1.2 | ABNORMAL |
| ⋮ | ⋮ | ⋮ | ⋮ |
| E | B | 2.8 | ABNORMAL |
| E | C | 0.0 | NORMAL |
| E | D | 0.0 | NORMAL |

FLOW ABNORMALITY JUDGMENT THRESHOLD VALUE = 1%

FIG. 11

| LINK | LOWER LINK | NUMBER OF NORMAL FLOW PASSAGES | NUMBER OF ABNORMAL FLOW PASSAGES | LINK PRIMARY ABNORMALITY JUDGMENT RESULTS |
|---|---|---|---|---|
| 1 (A⇔R1) | 4, 2 | 1 | 3 | NORMAL |
| 2 (R1⇔R2) | 5, 3 | 1 | 1 | NORMAL |
| 3 (B⇔R2) | - | 0 | 1 | ABNORMAL |
| 4 (R1⇔R3) | 9, 6 | 0 | 2 | ABNORMAL |
| 5 (R2⇔R5) | 8 | 1 | 0 | NORMAL |
| 6 (R3⇔R4) | 10 | 0 | 1 | ABNORMAL |
| 7 (R4⇔R5) | - | 0 | 0 | CANNOT BE JUDGED (NON-PASSAGE) |
| 8 (C⇔R5) | - | 1 | 0 | NORMAL |
| 9 (E⇔R3) | - | 0 | 1 | ABNORMAL |
| 10 (R4⇔R6) | 12 | 0 | 1 | ABNORMAL |
| 11 (R5⇔R6) | - | 0 | 0 | CANNOT BE JUDGED (NON-PASSAGE) |
| 12 (D⇔R6) | - | 0 | 1 | ABNORMAL |

FIG. 12

| LINK | LOWER LINK | NUMBER OF NORMAL FLOW PASSAGES | NUMBER OF ABNORMAL FLOW PASSAGES | LINK PRIMARY ABNORMALITY JUDGMENT RESULTS |
|---|---|---|---|---|
| 1 (A⇔R1) | - | 0 | 1 | ABNORMAL |
| 2 (R1⇔R2) | - | 0 | 0 | CANNOT BE JUDGED (NON-PASSAGE) |
| 3 (B⇔R2) | - | 0 | 1 | ABNORMAL |
| 4 (R1⇔R3) | 1 | 0 | 1 | ABNORMAL |
| 5 (R2⇔R5) | 3 | 0 | 1 | ABNORMAL |
| 6 (R3⇔R4) | 4, 9 | 1 | 1 | NORMAL |
| 7 (R4⇔R5) | - | 0 | 0 | CANNOT BE JUDGED (NON-PASSAGE) |
| 8 (C⇔R5) | - | 1 | 0 | NORMAL |
| 9 (E⇔R3) | - | 1 | 0 | NORMAL |
| 10 (R4⇔R6) | 6 | 1 | 1 | NORMAL |
| 11 (R5⇔R6) | 8, 5 | 1 | 1 | NORMAL |
| 12 (D⇔R6) | 11, 10 | 2 | 2 | NORMAL |

FIG. 15

| LINK | LOWER LINK | LINK PRIMARY ABNORMALITY JUDGMENT RESULTS | LINK SECONDARY ABNORMALITY JUDGMENT RESULTS |
|---|---|---|---|
| 1 (A⇔R1) | 4, 2 | NORMAL | NORMAL |
| 2 (R1⇔R2) | 5, 3 | NORMAL | NORMAL |
| 3 (B⇔R2) | - | ABNORMAL | HIGH PROBABILITY OF ABNORMALITY |
| 4 (R1⇔R3) | 9, 6 | ABNORMAL | HIGH PROBABILITY OF ABNORMALITY |
| 5 (R2⇔R5) | 8 | NORMAL | NORMAL |
| 6 (R3⇔R4) | 10 | ABNORMAL | LOW PROBABILITY OF ABNORMALITY |
| 7 (R4⇔R5) | - | CANNOT BE JUDGED (NON-PASSAGE) | CANNOT BE JUDGED (NON-PASSAGE) |
| 8 (C⇔R5) | - | NORMAL | NORMAL |
| 9 (E⇔R3) | - | ABNORMAL | LOW PROBABILITY OF ABNORMALITY |
| 10 (R4⇔R6) | 12 | ABNORMAL | LOW PROBABILITY OF ABNORMALITY |
| 11 (R5⇔R6) | - | CANNOT BE JUDGED (NON-PASSAGE) | CANNOT BE JUDGED (NON-PASSAGE) |
| 12 (D⇔R6) | - | ABNORMAL | LOW PROBABILITY OF ABNORMALITY |

IN LINK PRIMARY ABNORMALITY JUDGMENT
- - - : LINK JUDGED TO BE ABNORMAL
——— : LINK JUDGED TO BE NORMAL

FIG. 17

| LINK | LOWER LINK | LINK PRIMARY ABNORMALITY JUDGMENT RESULTS | LINK SECONDARY ABNORMALITY JUDGMENT RESULTS |
|---|---|---|---|
| 1 (A⇔R1) | - | ABNORMAL | HIGH PROBABILITY OF ABNORMALITY |
| 2 (R1⇔R2) | - | CANNOT BE JUDGED (NON-PASSAGE) | CANNOT BE JUDGED (NON-PASSAGE) |
| 3 (B⇔R2) | - | ABNORMAL | HIGH PROBABILITY OF ABNORMALITY |
| 4 (R1⇔R3) | 1 | ABNORMAL | HIGH PROBABILITY OF ABNORMALITY |
| 5 (R2⇔R5) | 3 | ABNORMAL | HIGH PROBABILITY OF ABNORMALITY |
| 6 (R3⇔R4) | 4, 9 | NORMAL | NORMAL |
| 7 (R4⇔R5) | - | CANNOT BE JUDGED (NON-PASSAGE) | CANNOT BE JUDGED (NON-PASSAGE) |
| 8 (C⇔R5) | - | NORMAL | NORMAL |
| 9 (E⇔R3) | - | NORMAL | NORMAL |
| 10 (R4⇔R6) | 6 | NORMAL | NORMAL |
| 11 (R5⇔R6) | 8, 5 | NORMAL | NORMAL |
| 12 (D⇔R6) | 11, 10 | NORMAL | NORMAL |

FIG. 20

| LINK | COMPILATION OF LINK SECONDARY ABNORMALITY JUDGMENT RESULTS | | | | LINK TERTIARY ABNORMALITY JUDGMENT RESULTS |
|---|---|---|---|---|---|
| | NORMAL | LOW PROBABILITY OF ABNORMALITY | HIGH PROBABILITY OF ABNORMALITY | NON-PASSAGE | |
| 1 (A⇔R1) | 2 | 2 | 1 | 0 | |
| 2 (R1⇔R2) | 2 | 2 | 0 | 1 | |
| 3 (B⇔R2) | 0 | 1 | 4 | 0 | |
| 4 (R1⇔R3) | 0 | 1 | 3 | 1 | |
| 5 (R2⇔R5) | 2 | 1 | 1 | 1 | |
| 6 (R3⇔R4) | 3 | 0 | 0 | 1 | |
| 7 (R4⇔R5) | 2 | 1 | 0 | 3 | |
| 8 (C⇔R5) | 4 | 1 | 0 | 0 | |
| 9 (E⇔R3) | 3 | 2 | 0 | 0 | |
| 10 (R4⇔R6) | 2 | 1 | 0 | 2 | |
| 11 (R5⇔R6) | 2 | 1 | 0 | 2 | |
| 12 (D⇔R6) | 3 | 2 | 0 | 0 | |

FIG. 21

| LINK | COMPILATION OF LINK SECONDARY ABNORMALITY JUDGMENT RESULTS | | | | LINK TERTIARY ABNORMALITY JUDGMENT RESULTS |
|---|---|---|---|---|---|
| | NORMAL | LOW PROBABILITY OF ABNORMALITY | HIGH PROBABILITY OF ABNORMALITY | NON-PASSAGE | |
| 1 (A⇔R1) | 2 | 2 | 1 | 0 | NORMAL |
| 2 (R1⇔R2) | 2 | 2 | 0 | 1 | NORMAL |
| 3 (B⇔R2) | 0 | 1 | 4 | 0 | HIGH PROBABILITY OF ABNORMALITY |
| 4 (R1⇔R3) | 0 | 1 | 3 | 1 | HIGH PROBABILITY OF ABNORMALITY |
| 5 (R2⇔R5) | 2 | 1 | 1 | 1 | NORMAL |
| 6 (R3⇔R4) | 3 | 1 | 0 | 1 | NORMAL |
| 7 (R4⇔R5) | 2 | 0 | 0 | 3 | NORMAL |
| 8 (C⇔R5) | 4 | 1 | 0 | 0 | NORMAL |
| 9 (E⇔R3) | 3 | 2 | 0 | 0 | NORMAL |
| 10 (R4⇔R6) | 2 | 1 | 0 | 2 | NORMAL |
| 11 (R5⇔R6) | 2 | 1 | 0 | 2 | NORMAL |
| 12 (D⇔R6) | 3 | 2 | 0 | 0 | NORMAL |

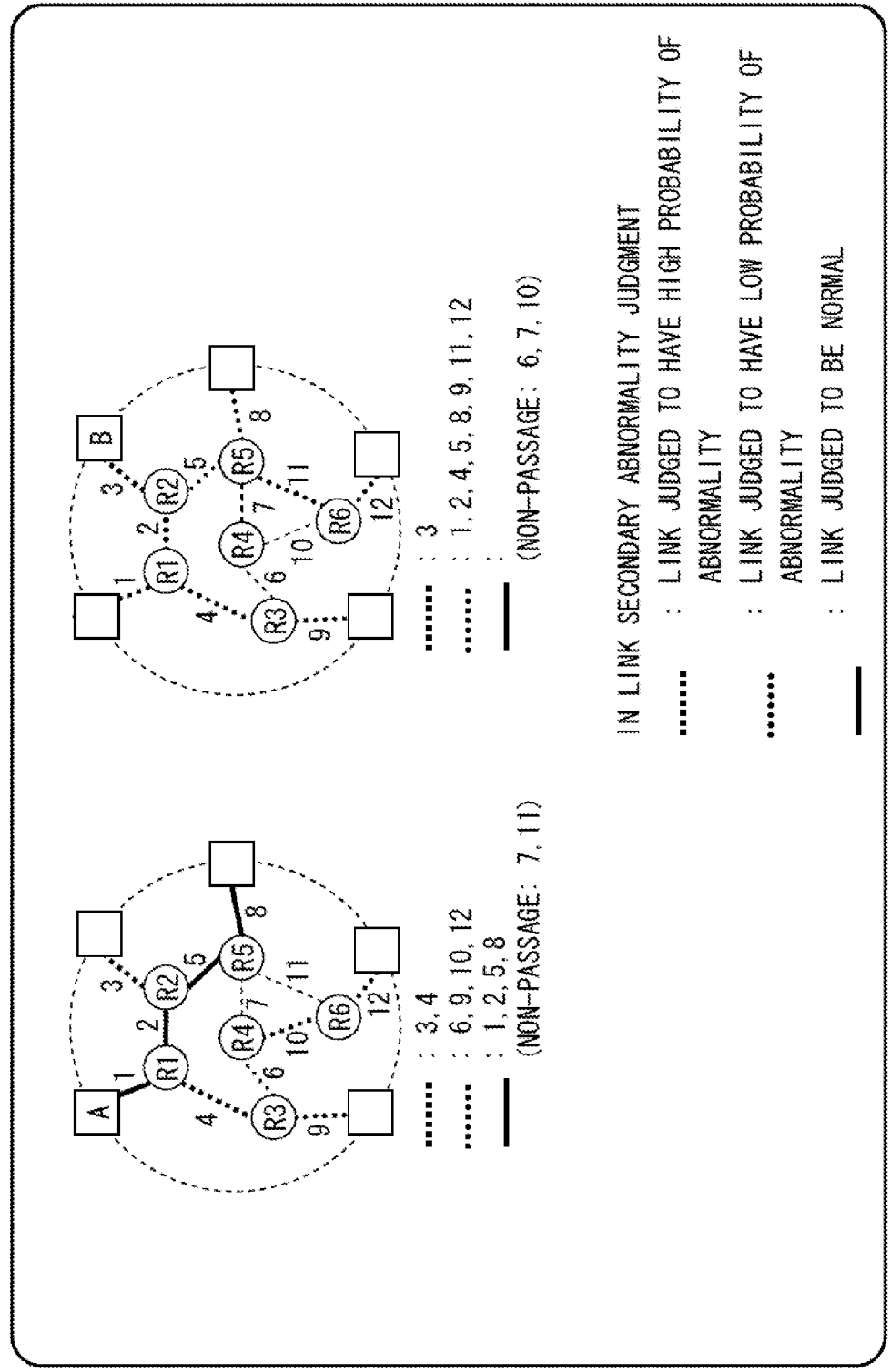

FIG. 23

| LINK | COMPILATION OF LINK SECONDARY ABNORMALITY JUDGMENT RESULTS | | | | LINK TERTIARY ABNORMALITY JUDGMENT RESULTS |
|---|---|---|---|---|---|
| | NORMAL | LOW PROBABILITY OF ABNORMALITY | HIGH PROBABILITY OF ABNORMALITY | NON-PASSAGE | |
| 1 (A⇔R1) | 1 | 1 | 0 | 0 | NORMAL |
| 2 (R1⇔R2) | 1 | 1 | 0 | 0 | NORMAL |
| 3 (B⇔R2) | 0 | 0 | 2 | 0 | HIGH PROBABILITY OF ABNORMALITY |
| 4 (R1⇔R3) | 0 | 1 | 1 | 0 | HIGH PROBABILITY OF ABNORMALITY |
| 5 (R2⇔R5) | 1 | 1 | 0 | 0 | NORMAL |
| 6 (R3⇔R4) | 0 | 1 | 0 | 1 | LOW PROBABILITY OF ABNORMALITY |
| 7 (R4⇔R5) | 0 | 0 | 0 | 2 | CANNOT BE JUDGED |
| 8 (C⇔R5) | 1 | 1 | 0 | 0 | NORMAL |
| 9 (E⇔R3) | 0 | 2 | 0 | 0 | LOW PROBABILITY OF ABNORMALITY |
| 10 (R4⇔R6) | 0 | 1 | 0 | 1 | LOW PROBABILITY OF ABNORMALITY |
| 11 (R5⇔R6) | 0 | 1 | 0 | 1 | LOW PROBABILITY OF ABNORMALITY |
| 12 (D⇔R6) | 0 | 2 | 0 | 0 | LOW PROBABILITY OF ABNORMALITY |

ABNORMAL POINT LOCATING APPARATUS, METHOD, AND STORAGE MEDIUM

CROSS-REFERENCE TO RELATED APPLICATION

This application is based upon and claims the benefit of priority from the prior Japanese Patent Application No. 2009-10279 filed on Jan. 20, 2009, the entire contents of which are incorporated herein by reference.

BACKGROUND

1. Field

Embodiments of the present invention relate to a technique of locating an abnormal point of a network.

2. Description of Related Art

As an electrical data network, such as a computer network, becomes complicated and diversified, a technique of locating an abnormal point of the electrical data network (hereinafter "network" for short) quickly and accurately is sought after in the field of network monitoring/failure monitoring.

Conventionally, as an example of a technique of locating an abnormal point of a network, a network tomography analysis technique of analyzing an abnormal point in a network based on normality/abnormality information of an end-end observation flow (measurement flow) in the network is known (for example, see Japanese Laid-open Patent Publication No. 2006-238052).

Moreover, as another example of a technique of locating an abnormal point of a network, a technique of making a network abnormality diagnosis by using a tree structure is known (for example, see Japanese Laid-open Patent Publication No. 2006-229421).

For example, an outline of the network tomography analysis technique is shown in FIGS. 1 and 2. FIG. 1 illustrates an example of a network that locates an abnormal point. Moreover, FIG. 2 is an example of a matrix in which an observation flow passage link through which an observation flow in which an abnormality has been observed passes (goes) is mapped to an observation flow.

The network shown in FIG. 1 has flow quality measurement agents A to E, relay nodes R1 to R6, and links 1 to 12. Incidentally, the links 3 and 4 are abnormal links (links in which packet loss occurs) in which an abnormality occurs. Moreover, an observation flow is represented by a symbol for a source flow quality measurement agent and a symbol for a destination flow quality measurement agent. For example, an observation flow observed by a source flow quality measurement agent A and a destination flow quality measurement agent B is represented as an observation flow AB.

For example, a general procedure of the network tomography analysis technique includes procedure 1 by which a judgment (or determination) is made as to whether each observation flow is normal or abnormal, and normality/abnormality information is mapped to a link (an observation flow passage link) through which the observation flow passes, and procedure 2 by which a link set covering an observation flow (an abnormal flow) in which an abnormality has been observed in a minimum number of links is judged to be a suspected point. In the case of the matrix of FIG. 2, since two links (a minimum number), which are the links 3 and 4, can cover all abnormal flows, the links 3 and 4 are identified as an abnormal point.

SUMMARY

According to an aspect of an embodiment, an abnormal point locating method includes: a link primary abnormality judgment procedure that acquires information on a link through which each observation flow passes, locates a link through which an observation flow observed at an observation point passes, and judges (or determines) whether the located link is normal or abnormal based on the observation flow; a link secondary abnormality judgment procedure that judges a probability of abnormality based on a result of the link primary abnormality judgment procedure by using a connection relationship as seen from each observation point; and a link tertiary abnormality judgment procedure that judges a probability of abnormality of a link based on a results of the link secondary abnormality judgment procedure on an each observation point.

It is to be understood that both the foregoing summary description and the following detailed description are explanatory as to various embodiments of the present invention, and are not restrictive of the present invention as claimed.

BRIEF DESCRIPTION OF THE DRAWINGS

FIG. 2 illustrates an example of a matrix in which an observation flow passage link through which an observation flow in which an abnormality has been observed passes (goes) is mapped to an observation flow;

FIGS. 3A to 3C explain a link secondary abnormality judgment;

FIGS. 4A to 4C explain a link tertiary abnormality judgment;

FIG. 7 illustrates an example of the configuration of a flow quality information storage DB;

FIG. 8 illustrates an example of the configuration of a NW path information storage DB;

FIG. 9 illustrates an example of the configuration of a flow abnormality judgment result DB;

FIG. 11 illustrates the result of a link primary abnormality judgment performed by using an observation point A as a starting point;

FIG. 12 illustrates the result of a link primary abnormality judgment performed by using an observation point D as a starting point;

FIG. 15 illustrates the result of a link secondary abnormality judgment performed by using the observation point A as a starting point;

FIG. 17 illustrates the result of a link secondary abnormality judgment performed by using the observation point D as a starting point;

FIG. 20 illustrates a link tertiary abnormality judgment processing process in which the link secondary abnormality judgment results obtained by using each of the observation points A to E as a starting point are compiled on a link-by-link basis;

FIG. 21 illustrates the result of a link tertiary abnormality judgment performed by using the observation points A to E as a starting point;

FIG. 22 illustrates an image of the result of a link secondary abnormality judgment performed by using the observation points A and B as a starting point;

FIG. 23 illustrates the result of a link tertiary abnormality judgment performed by using the observation points A and B as a starting point.

DETAILED DESCRIPTION OF EXAMPLE EMBODIMENTS

Figure 1:
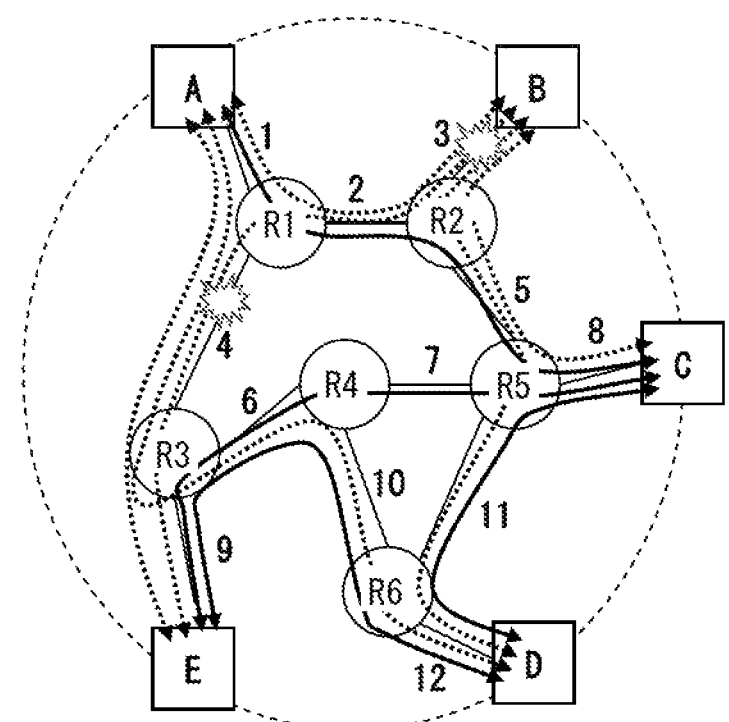
FIG. 1 illustrates an example of the configuration of a network that locates an abnormal point.

Next, an embodiment will be described with reference to the drawings based on the following practical example. Incidentally, a link in the following practical example represents an area including the link itself and nodes at both ends thereof. That is, the practical example does not specify which of the link itself and the nodes at both ends thereof has an abnormality.

Instead of judging (or determining) an abnormal point by bringing together observation flows observed at a plurality of observation points, an abnormal point locating apparatus of the practical example locates an abnormal point by judging an abnormal point in advance on an observation point-by-observation point basis based on an observation flow observed at each observation point and compiling the judgment results ultimately. When an abnormal point is judged by using an observation flow observed at one observation point, the observation flow has a tree-like shape. Therefore, when an abnormal point is judged by using an observation flow observed at one observation point, a processing load may be alleviated by using a link upper/lower connection (adjacency) relationship.

Moreover, when an abnormal point is judged (or determined) by using an observation flow observed at one observation point (observation point-by-observation point basis), observation flows observed at other observation points become unnecessary. This makes it possible to perform parallel/distributed processing easily and achieve further alleviation of a processing load.

On the other hand, a conventional network tomography analysis technique judges an abnormal point based on all observation flows observed at a plurality of observation points, and therefore may not perform parallel/distributed processing. Since the conventional network tomography analysis technique formulates the link connection relationship characteristics of a network by making the characteristics degenerate into one dimension, a processing load is considered to increase.

The abnormal point locating apparatus of the practical example locates an abnormal point where an abnormal condition, for example, packet loss, delay or something appears by the following four procedures. Procedure 1 judges, as a flow abnormality judgment, whether an observation flow is normal or abnormal. Procedure 2 performs a primary judgment as to whether a link is normal or abnormal on an observation point-by-observation point basis as a link primary abnormality judgment by mapping, to a link through which an observation flow passes, the result of an observation flow normality/abnormality judgment obtained at each observation point.

Procedure 3 judges an abnormal point on an observation point-by-observation point basis in advance as a link secondary abnormality judgment by using an observation flow observed at each observation point. The link secondary abnormality judgment performs a secondary judgment of the probability of abnormality of a link based on the link primary abnormality judgment result by using a tree-shaped upper/lower link connection relationship as seen from one observation point.

Procedure 4 makes a judgment as a link tertiary abnormality judgment by compiling the abnormal point judgments at the observation points. The link tertiary abnormality judgment performs a ternary judgment of the probability of abnormality of a link by compiling the link secondary abnormality judgment results at the observation points, and locates an abnormal point.

Based on the link primary abnormality judgment result, the link secondary abnormality judgment performs a probabilistic judgment of the probability of abnormality as shown in FIGS. 3A to 3C with consideration given to the link tertiary abnormality judgment of the next procedure 4. FIGS. 3A to 3C explain the link secondary abnormality judgment. Incidentally, in FIGS. 3A to 3C, R1 to R5 denote relay nodes, and L1 to L4 denote links.

Specifically, in the link secondary abnormality judgment, analysis is conducted from an upper link (for example, in FIGS. 3A to 3C, a link L1) close to an observation point. FIGS. 3A to 3C illustrate an example in which analysis is conducted by using the link L1 as an upper link and links L2 to L4 as lower links.

FIG. 3A illustrates a case in which an upper link is judged to be abnormal by a link primary abnormality judging unit, the case in which all lower links through which an observation flow passes are abnormal and there are two or more lower links.

In the case of FIG. 3A, assuming that the upper link L1 is normal, all the lower links L2 to L4 are to be judged to be abnormal. However, in general, the probability of occurrence of link simultaneous failure becomes extremely low as the number of simultaneous failure links increases. Therefore, in the case of FIG. 3A, the upper link L1 is judged to have a high probability of abnormality. When the upper link L1 is abnormal, irrespective of whether the lower links L2 to L4 and below are normal or abnormal, an observation flow passing therethrough is abnormal. Therefore, in the case of FIG. 3A, it is appropriate to judge that all of the lower links L2 to L4 and below have a low probability of abnormality.

FIG. 3B illustrates a case in which an upper link is judged to be abnormal by the link primary abnormality judging unit, the case in which all lower links through which an observation flow passes are abnormal and there is one lower link.

In the case of FIG. 3B, because an observation flow does not branch between the upper link L1 and the lower link L3, it is impossible to judge whether the upper link L1 is abnormal or the lower link L3 is abnormal based only on information from FIG. 3B. Therefore, in the case of FIG. 3B, it is appropriate to judge that the upper link L1 has substantially the same probability of abnormality as the lower link L3 by judging the probability of abnormality of the lower link L3 by using the judgment result of a link lower than the lower link L3. Thus, in the case of FIG. 3B, analysis and judgment is sequentially made on the links lower than the lower link L3 by linking the judgment on the upper link L1 to the judgment result of the lower link L3.

FIG. 3C illustrates a case in which an upper link is judged to be abnormal by the link primary abnormality judging unit and some of lower links through which an observation flow passes are normal. It is assumed here that the lower links L3 and L4 are judged to be normal and the lower link L2 is judged to be abnormal.

In the case of FIG. 3C, assuming that the upper link L1 is abnormal, since all observation flows passing through the upper link L1 are abnormal, all the lower links L2 to L4 are abnormal. This contradicts the judgment that the lower links L3 and L4 are normal. Therefore, in the case of FIG. 3C, it is appropriate to judge that the upper link L1 is normal, and make a judgment on the lower links L2 to L4 by using the judgment result of a link lower than the lower links L2 to L4.

Incidentally, when an upper link is judged to be normal by the link primary abnormality judging unit, the link is judged to be a normal link also by a link secondary abnormality judging unit, and analysis and judgment is further made sequentially on the lower links L2 to L4 and below.

As a result of a link secondary abnormality judgment at each observation point, a link in which an abnormality occurs is judged to have a high probability of abnormality or a low probability of abnormality. As described above, by diagnosing the probability of abnormality of a link in three levels, normal, a high probability of abnormality, and a low probability of abnormality, the abnormal point locating apparatus of the practical example may reliably prevent an abnormal link from being undetected (False Negative) by adopting a diagnosis result including two abnormal levels (a high probability of abnormality and a low probability of abnormality).

It is to be noted that diagnosing the probability of abnormality of a link in three levels, normal, a high probability of abnormality, and a low probability of abnormality, also applies to a link tertiary abnormality judgment result, which will be described later. Incidentally, since the conventional network tomography analysis technique makes a two-level diagnosis in the procedure 2 by which a link set covering an abnormal flow with a minimum number of links is judged to be an abnormal link and the other areas are judged to be a normal link, depending on an occurrence pattern of a link abnormality, an abnormal link may be erroneously judged to be normal.

The link tertiary abnormality judgment performs a judgment of the probability of abnormality as shown in FIGS. 4A to 4C by compiling the link secondary abnormality judgment results at the observation points and using a characteristic (characteristic 1) of the link secondary abnormality judgment result and a characteristic (characteristic 2) based on which a link judged to be normal at one or more observation points may be identified as being normal. FIGS. 4A to 4C explain the link tertiary abnormality judgment. Incidentally, in FIGS. 4A to 4C, R1 to R6 denote relay nodes, and L1 to L13 denote links.

For example, FIG. 4A indicates the link secondary abnormality judgment result obtained by using an observation point A as a starting point. It is assumed that, in FIG. 4A, the links L1, L2, and L7 are judged to be normal, the links L8 and L12 are judged to have a high probability of abnormality, the links L3 to L6, L9, and L11 are judged to have a low probability of abnormality, and the links L10 and L13 are judged to be a link that cannot be diagnosed (a non-passage link).

Moreover, FIG. 4B indicates the link secondary abnormality judgment result obtained by using an observation point B as a starting point. It is assumed that, in FIG. 4B, the links L3, L4, and L9 are judged to be normal, the links L2, L8, and L10 are judged to have a high probability of abnormality, the links L1, L5, L6, L11, and L12 are judged to have a low probability of abnormality, and the links L7 and L13 are judged to be a link that cannot be diagnosed (a non-passage link).

Specifically, in the link tertiary abnormality judgment, the link secondary abnormality judgment results at the observation points are compiled (combined together) on a link-by-link basis. A link judged to be normal at one or more observation points may be judged to be normal based on the above-described characteristic 2. Moreover, a link that is not judged to be normal at one or more observation points and is judged to have a high probability of abnormality at one or more observation points may be judged to have a high probability of abnormality based on the above-described characteristic 1.

Furthermore, a link that is not judged to be normal and have a high probability of abnormality at one or more observation points and is judged to have a low probability of abnormality at one or more observation points is a link whose probability of abnormality cannot be judged based only on the link secondary abnormality judgment results at the observation points, and may be judged to have a low probability of abnormality. Incidentally, when an observation flow may be observed at a sufficient number of observation points with respect to a network which is an object to be monitored, usually a link is not judged to have a low probability of abnormality.

The above-described probabilities of abnormality in three levels do not apply to a link through which the observation flow observed at each observation point does not pass at all, and the probability of abnormality cannot be judged at all. Therefore, a link through which the observation flow observed at each observation point does not pass at all may be judged to be a link that cannot be diagnosed.

For example, FIG. 4C indicates the link tertiary abnormality judgment result obtained by compiling the link secondary abnormality judgment result of FIG. 4A obtained by using the observation point A as a starting point and the link secondary abnormality judgment result of FIG. 4B obtained by using the observation point B as a starting point. In FIG. 4C, the links L1 to L4, L7, and L9 are judged to be normal, the links L8, L10, and L12 are judged to have a high probability of abnormality, the links L5, L6, and L11 are judged to have a low probability of abnormality, and the link 13 is judged to be a link that cannot be diagnosed.

The abnormal point locating apparatus of the practical example may judge the probability of abnormality on a link-by-link basis by using the observation flows observed at all observation points by link tertiary abnormality judgment processing, and easily locate an abnormal point based on the result of the probability of abnormality judged on a link-by-link basis. That is, the link tertiary abnormality judgment result indicates the final abnormal point judgment result.

Practical Example 1

Figure 5:
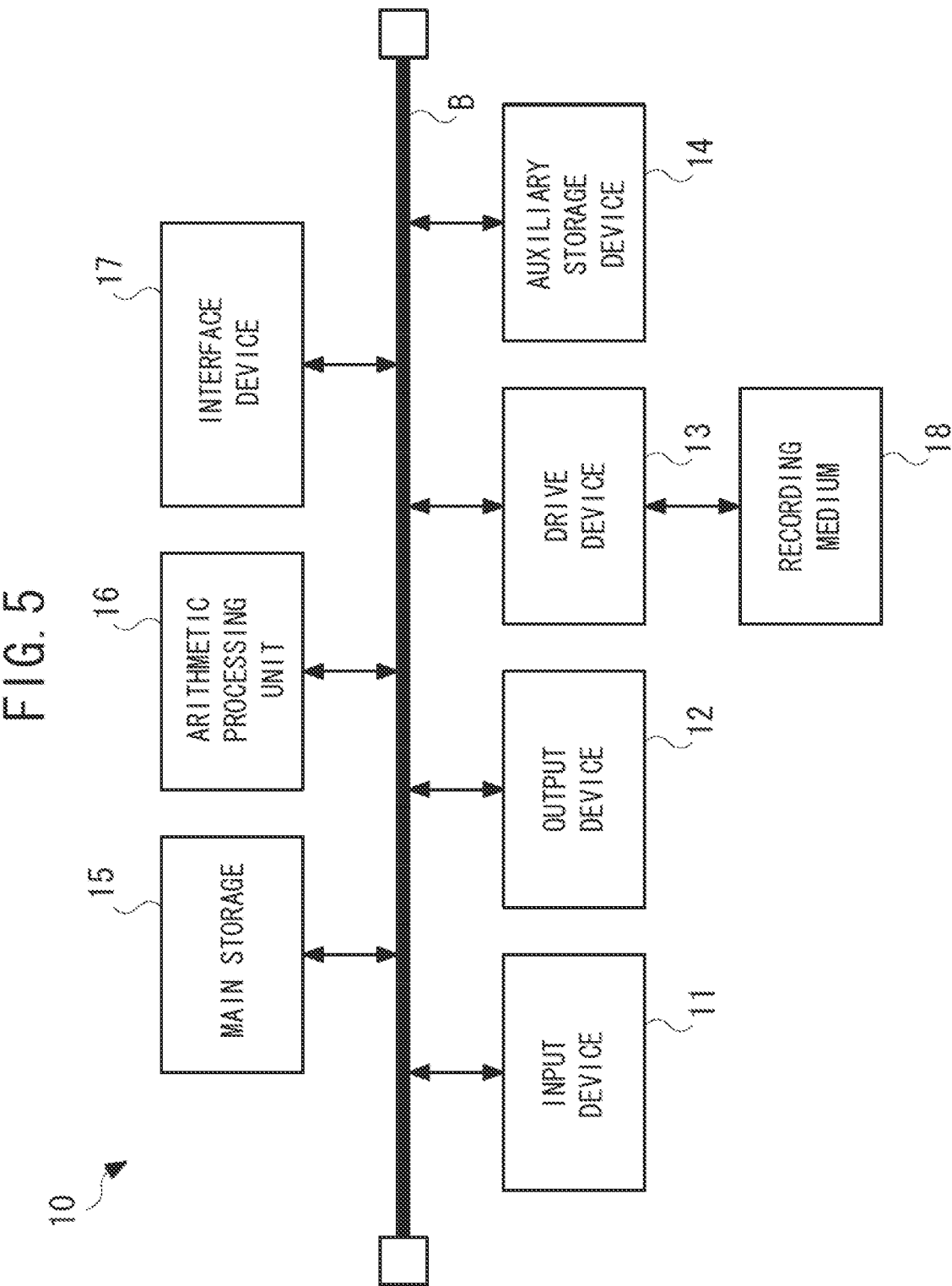
FIG. 5 illustrates an example of a hardware configuration of an abnormal point locating apparatus.

FIG. 5 illustrates an example of hardware of an abnormal point locating apparatus. An abnormal point locating apparatus 10 includes an input device 11, an output device 12, a drive device 13, an auxiliary storage device 14, a main storage 15, an arithmetic processing unit 16, and an interface device 17, which are connected to one another by a bus B.

The input device 11 such as a keyboard or a mouse is used to input various signals. The output device 12 is a display device or the like, and is used to display various windows, data, and the like. The interface device 17 such as a modem or a LAN card is used to establish connection with the network.

An abnormal point locating program of the practical example is at least part of various programs controlling the abnormal point locating apparatus 10. The abnormal point locating program is provided by, for example, distribution of a recording medium 18 or downloading from the network. As the recording medium 18 in which the abnormal point locating program is recorded, various types of recording media such as recording media including a CD-ROM, a flexible disk, a magnetic optical disk, and the like, that record information optically, electrically, or magnetically, or a semiconductor memory, such as a ROM or a flash memory, that records information electrically may be used.

Moreover, when the recording medium 18 in which the abnormal point locating program is recorded is loaded into the drive device 13, the abnormal point locating program is installed from the recording medium 18 on the auxiliary storage device 14 via the drive device 13. The abnormal point locating program downloaded from the network is installed on the auxiliary storage device 14 via the interface device 17.

The auxiliary storage device 14 stores the installed abnormal point locating program, and stores necessary files, data, and the like. At the time of startup of the abnormal point locating program, the main storage 15 reads the abnormal point locating program from the auxiliary storage device 14, and stores the program. Then, the arithmetic processing unit 16 realizes various types of processing, which will be described later, according to the abnormal point locating program stored in the main storage 15.

Figure 6:
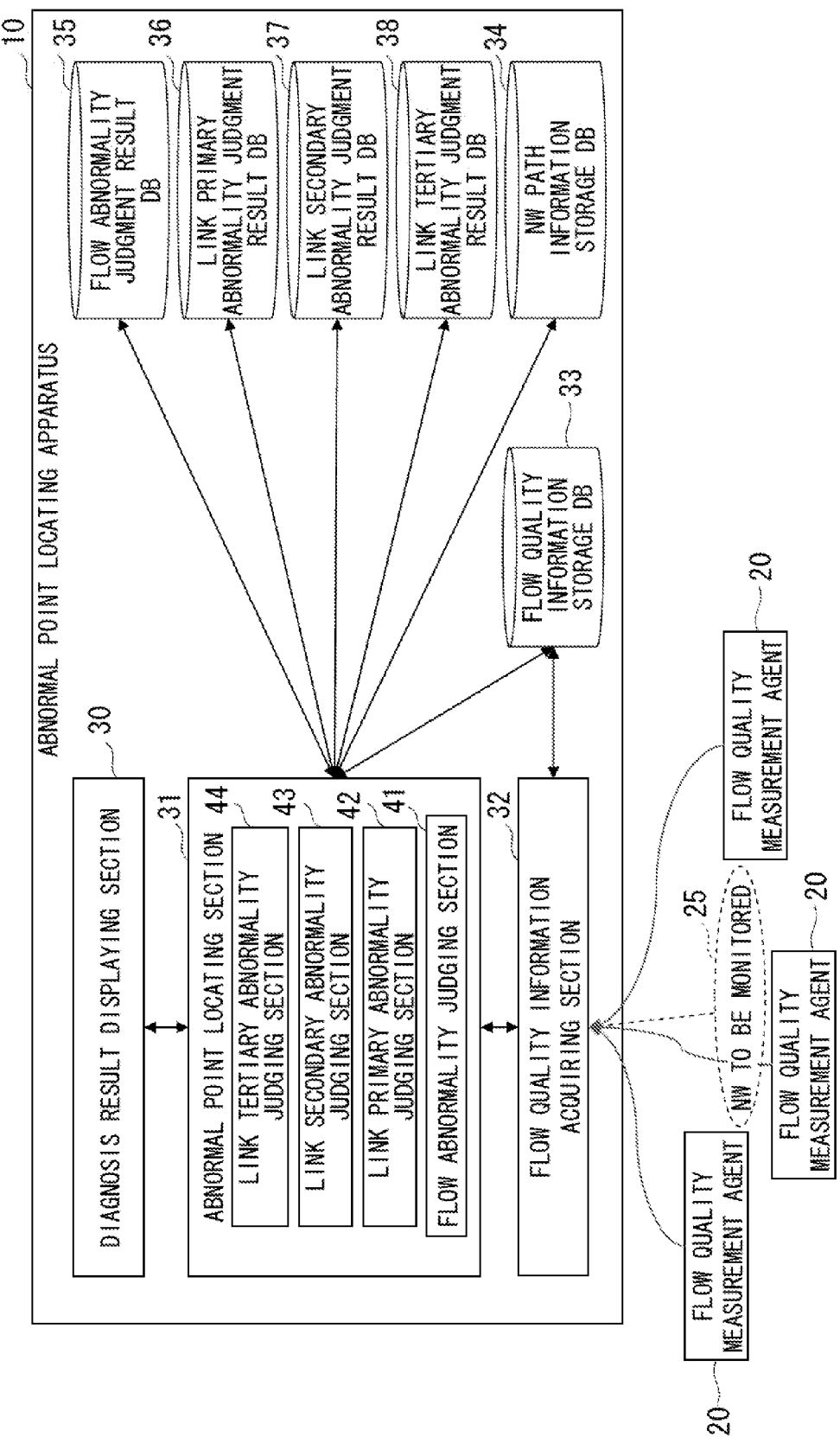
FIG. 6 is a block diagram of an example of processing performed by the abnormal point locating apparatus.

Incidentally, processing blocks of the abnormal point locating apparatus 10 shown in FIG. 6 are realized as a result of the arithmetic processing unit 16 executing the abnormal point locating program. FIG. 6 is a block diagram of an example of the abnormal point locating apparatus.

The abnormal point locating apparatus 10 includes a diagnosis result displaying section 30, an abnormal point locating section 31, a flow quality information acquiring section 32, a flow quality information storage DB (database) 33, a NW (network) path information storage DB 34, a flow abnormality judgment result DB 35, a link primary abnormality judgment result DB 36, a link secondary abnormality judgment result DB 37, and a link tertiary abnormality judgment result DB 38.

The diagnosis result displaying section 30 displays the diagnosis result of an abnormal point of a NW 25 to be monitored on the output device 12 or a NW management terminal, for example. The abnormal point locating section 31 locates an abnormal point of the NW 25 to be monitored. Moreover, the flow quality information acquiring section 32 acquires flow quality information from a plurality of flow quality measurement agents 20 provided in the NW 25 to be monitored.

The flow quality information storage DB 33 stores the flow quality information acquired by the flow quality information acquiring section 32. The NW path information storage DB 34 stores passage path information of an observation flow. The flow abnormality judgment result DB 35 stores a flow abnormality judgment result, which will be described later. The link primary abnormality judgment result DB 36 stores a link primary abnormality judgment result, which will be described later. The link secondary abnormality judgment result DB 37 stores a link secondary abnormality judgment result, which will be described later. The link tertiary abnormality judgment result DB 38 stores a link tertiary abnormality judgment result, which will be described later.

Moreover, the abnormal point locating section 31 includes a flow abnormality judging section 41, a link primary abnormality judging section 42, a link secondary abnormality judging section 43, and a link tertiary abnormality judging section 44. The flow abnormality judging section 41 judges whether an observation flow is normal or abnormal based on the flow quality information stored in the flow quality information storage DB 33, and makes the flow abnormality judgment result DB 35 store the judgment result as the flow abnormality judgment result.

The link primary abnormality judging section 42 judges whether each link is normal or abnormal by mapping the flow abnormality judgment result to a link through which an observation flow observed at one observation point passes, and makes the link primary abnormality judgment result DB 36 store the judgment result as the link primary abnormality judgment result.

The link secondary abnormality judging section 43 judges the probability of abnormality of a link in three levels based on the link primary abnormality judgment result by using a tree-shaped upper/lower link connection relationship as seen from one observation point, and makes the link secondary abnormality judgment result DB 37 store the judgment result as the link secondary abnormality judgment result.

The link tertiary abnormality judging section 44 judges the probability of abnormality of a link in three levels by compiling the link secondary abnormality judgment results at the observation points, and makes the link tertiary abnormality judgment result DB 38 store the judgment result as the link tertiary abnormality judgment result.

Although the abnormal point locating apparatus 10 of FIG. 6 realizes the flow abnormality judging section 41, the link primary abnormality judging section 42, and the link secondary abnormality judging section 43 in one apparatus, the flow abnormality judging section 41, the link primary abnormality judging section 42, and the link secondary abnormality judging section 43 may be distributed in different apparatuses. In this case, the flow quality information acquiring section 32 and the flow quality information storage DB 33 respectively serve as a unit for acquiring the link secondary abnormality judgment result obtained by the link secondary abnormality judging section 43 distributed in another apparatus and a unit for storing the link secondary abnormality judgment result.

Moreover, it is assumed that a plurality of flow quality measurement agents 20 for measuring the quality of the observation flow are provided in the NW 25 to be monitored. The flow quality measurement agent 20 may be realized by being incorporated into a relay node, or may be realized in an external apparatus. Furthermore, the quality of the observation flow may be measured by using a method by which the quality is measured by actively passing a measurement packet between the flow quality measurement agents 20 or a method by which the quality is passively measured by monitoring a flowing user packet.

The flow quality information to be measured includes a packet loss rate, a delay, jitter, the presence or absence of communication, and the like. The flow quality information to be measured is not limited to a specific type of information, and any type of information may be used as long as it is possible to judge whether an observation flow is abnormal or normal based on that information. Incidentally, the flow quality measurement agent 20 is disposed at each observation point.

In this practical example, the network shown in FIG. 1 will be described as an example of the NW 25 to be monitored. The network shown in FIG. 1 includes flow quality measurement agents A to E, relay nodes R1 to R6, and links 1 to 12. Incidentally, it is assumed that an abnormality occurs simultaneously in the links 3 and 4.

The network shown in FIG. 1 regularly measures the quality of the observation flow between the flow quality measurement agents A to E by actively passing a measurement packet between five flow quality measurement agents (observation points) A to E, and makes the abnormal point locating apparatus 10 acquire the measurement result. The relay nodes R1 to R6 are connected between the observation points.

In the following description, it is assumed that the quality of the observation flow between the flow quality measurement agents A to E is regularly measured by actively passing a measurement packet between the flow quality measurement agents A to E. However, the following description does not depend on how to measure the quality of the observation flow, and the quality of the observation flow may be measured by passively measuring a user packet flowing through the flow quality measurement agents A to E.

Moreover, the following description assumes that an object based on which the quality of the observation flow is measured is a packet loss rate. However, the description does not depend on an object based on which the quality of the observation flow is measured, and may use a delay, jitter, a breakdown of communication, or the like, as an object based on which the quality of the observation flow is measured.

(The Flow Quality Information Acquiring Section 32 and the Flow Quality Information Storage DB 33)

FIG. 7 illustrates an example of the configuration of the flow quality information storage DB. The flow quality information acquiring section 32 of the abnormal point locating apparatus 10 acquires the results of quality measurement of the observation flows measured at the observation points (the flow quality measurement agents A to E). When the flow quality information acquiring section 32 acquires the observation flow quality measurement results, the flow quality information acquiring section 32 makes the flow quality information storage DB 33 store source information (a source observation point), destination information (an opposed observation point), quality information (a packet loss rate) of the observation flow.

In the case of the network shown in FIG. 1, the quality information observed at the source observation point A indicates the absence of a packet loss because no abnormal link is present in a path though which an observation flow AC passes to the opposed observation point C. On the other hand, the quality information observed at the source observation point A indicates the presence of a packet loss because an abnormal link is present in a path through which the observation flows AB, AD, and AE pass to the opposed observation points B, D, and E.

Although the flow quality information storage DB 33 of FIG. 7 stores the flow quality information of all the observation points A to E in one table, the flow quality information storage DB 33 may store the flow quality information of the observation points A to E in separate tables prepared for the observation points A to E. Moreover, although the flow quality information storage DB 33 of FIG. 7 stores a packet loss rate as the quality information, the flow quality information storage DB 33 may store the total number of measurement packets before the calculation of a packet loss rate and the total number of packet losses.

Moreover, although the flow quality information storage DB 33 of FIG. 7 indicates the results of measurement of a one-way packet loss rate, the flow quality information storage DB 33 may indicate the result of measurement of a two-way packet loss rate. Furthermore, the flow quality information storage DB 33 of FIG. 7 may store the results of judgment as to whether the observation flow is normal or abnormal. When the results of judgment as to whether the observation flow is normal or abnormal are stored in the flow quality information storage DB 33, there is no need for processing performed by the flow abnormality judging section 41 to judge whether the observation flow is normal or abnormal.

(The NW Path Information Storage DB 34)

FIG. 8 illustrates an example of the configuration of the NW path information storage DB. The NW path information storage DB 34 of the abnormal point locating apparatus 10 stores the passage path information corresponding to a pair of source information (a source observation point) and destination information (an opposed observation point) of the observation flow.

In the case of the network shown in FIG. 1, information indicating that the observation flow from the source observation point A to the opposed observation point B, for example, passes through the path "the observation point A→the relay node R1→the relay node R2→the observation point B" is stored. Although the NW path information storage DB 34 of FIG. 8 stores the passage path on a hop-by-hop basis with the relay nodes R1 to R6, the NW path information storage DB 34 may store the passage path on a hop-by-hop basis with the links 1 to 12.

Moreover, although the NW path information storage DB 34 of FIG. 8 stores all the NW path information between the observation points A to E in one table, the NW path information storage DB 34 may independently manage all the NW path information between the observation points A to E as routing information (a routing table) of the relay nodes R1 to R6, instead of holding all the NW path information between the observation points A to E as one table, and extract the NW path information between the observation points A to E as a combination or the like of the routing information when the NW path information between the observation points A to E is necessary or desired.

The passage path information between the observation points A to E is acquired by using a command such as traceroute from the observation points A to E, referring to a routing table or the like in the relay nodes R1 to R6 in the NW 25 to be monitored, or conducting monitoring analysis on a dynamic routing protocol (OSPF: Open Shortest Path First) flowing in the NW 25 to be monitored. Any method for acquiring the passage path information between the observation points A to E may be adopted.

(The Flow Abnormality Judging Section 32 and the Flow Abnormality Judgment Result DB 35)

FIG. 9 illustrates an example of the configuration of the flow abnormality judgment result DB. The flow abnormality judging section 41 of the abnormal point locating apparatus 10 acquires the flow quality information shown in FIG. 7 and stored in the flow quality information storage DB 33. Moreover, in this practical example, it is assumed that a flow abnormality judgment threshold value of a packet loss rate (quality information) is set to 1% in advance.

The flow abnormality judging section 41 judges that an observation flow whose packet loss rate is smaller than the flow abnormality judgment threshold value to be normal and an observation flow whose packet loss rate is equal to or greater than the flow abnormality judgment threshold value to be abnormal by referring to the acquired flow quality information shown in FIG. 7, and makes the flow abnormality judgment result DB 35 of FIG. 9 store the judgment result as the flow abnormality judgment result. In the case of the network shown in FIG. 1, for example, the observation flow AC is judged to be normal, and the observation flows AB, AD, and AE are judged to be abnormal.

(The Link Primary Abnormality Judging Section 42 and the Link Primary Abnormality Judgment Result DB 36)

Figure 10:
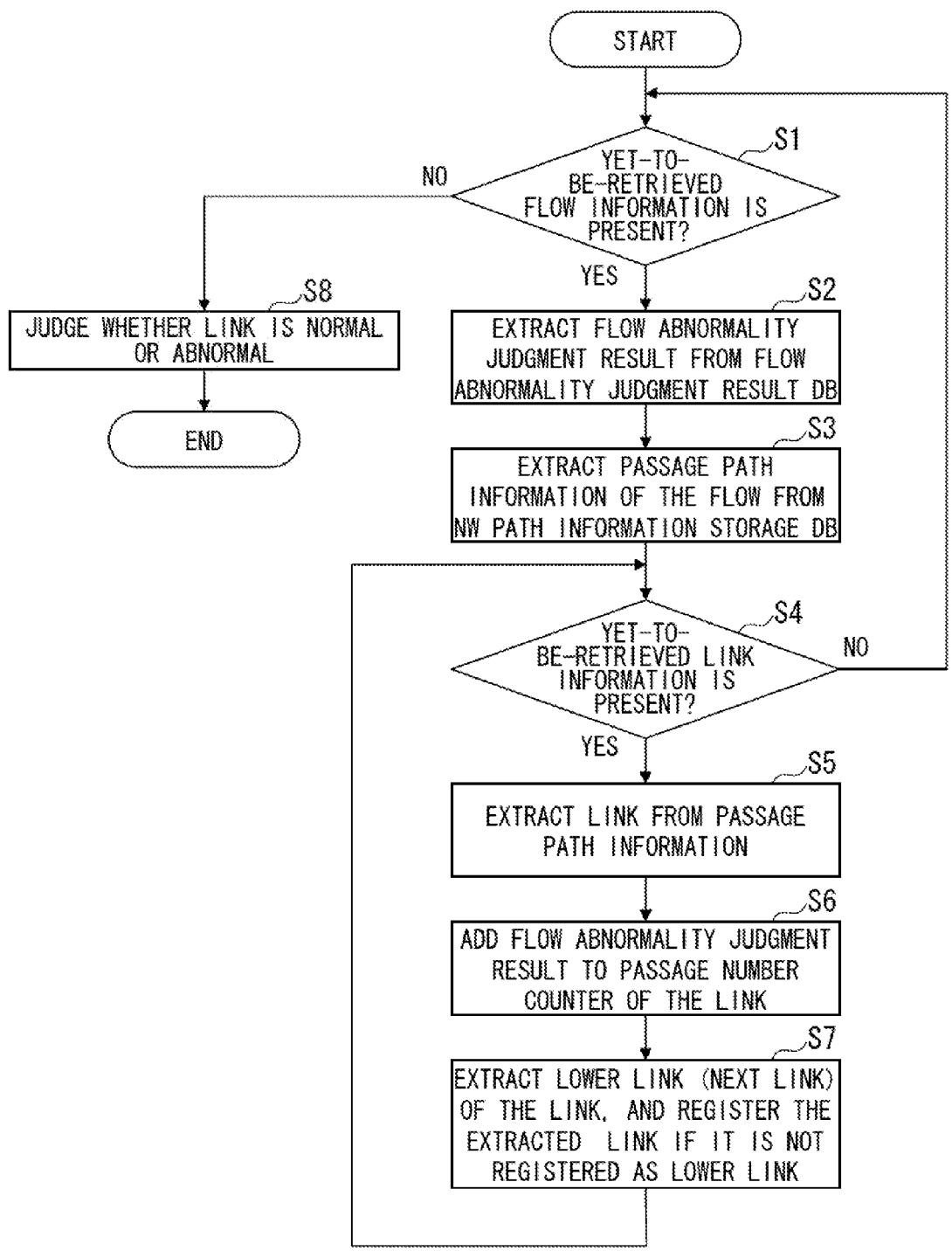
FIG. 10 is a flow chart of an example of processing performed by a link primary abnormality judging section.

FIG. 10 is a flow chart of an example of processing performed by the link primary abnormality judging section. The link primary abnormality judging section 42 processes the flow chart of FIG. 10 for each of the observation points A to E. The flow chart of FIG. 10 maps the flow abnormality judgment result to a link through which an observation flow observed at one observation point passes, judges whether each link is normal or abnormal, and makes the link primary abnormality judgment result DB 36 store the judgment result as the link primary abnormality judgment result.

Here, processing of the flow chart of FIG. 10 will be described by taking up the observation flow AB observed at the observation point A as an example. The procedure proceeds to S1, and the link primary abnormality judging section 42 selects a yet-to-be-retrieved observation flow from the observation flows observed at the observation point A by referring to the flow abnormality judgment result DB 35. It is assumed here that the observation flow AB is selected as a yet-to-be-retrieved observation flow.

The procedure proceeds to S2, and the link primary abnormality judging section 42 extracts the flow abnormality judgment result "abnormal" of the observation flow AB from the flow abnormality judgment result DB 35. The procedure proceeds to S3, and the link primary abnormality judging section 42 extracts "the observation point A→the relay node R1→the relay node R2→the observation point B" as the passage path information of the observation flow AB from the NW path information storage DB 34.

The procedure proceeds to S4, and the link primary abnormality judging section 42 judges whether or not a yet-to-be-retrieved link is included in the passage path information extracted in S3. Here, it is judged that a yet-to-be-retrieved link is included in the passage path information extracted in S3, and the procedure proceeds to S5.

In S5, the link primary abnormality judging section 42 extracts, from the passage path information extracted in S3, the link 1 between the observation point A and the relay node R1. The procedure proceeds to S6, and the link primary abnormality judging section 42 increments an abnormal flow passage number counter of the link 1 between the observation point A and the relay node R1 by 1 based on the flow abnormality judgment result of the observation flow AB, the flow abnormality judgment result extracted in S2.

The procedure proceeds to S7, and the link primary abnormality judging section 42 extracts a lower link (the link 2 between the relay nodes R1 and R2) of the link 1 between the observation point A and the relay node R1, and, if the extracted link is not registered as a lower link of the link 1, registers the link 2 as a lower link of the link 1, and goes back to S4; if the extracted link is registered as a lower link of the link 1, goes back to S4 without registering the link 2 as a lower link of the link 1. By registering the link 2 as a lower link of the link 1, it becomes possible to use a connection relationship (an upper/lower relationship) between the link 1 and the link 2 in link secondary abnormality judgment processing.

Similarly, the link primary abnormality judging section 42 extracts the link 2 between the relay nodes R1 and R2 in S4 to S7, increments an abnormal flow passage number counter of the link 2 between the relay nodes R1 and R2 by 1, extracts a lower link (the link 3 between the observation point B and the relay node R2) of the link 2, registers the link 3 as a lower link of the link 2, and goes back to S4.

Similarly, the link primary abnormality judging section 42 extracts the link 3 between the observation point B and the relay node R2 in S4 to S7, increments an abnormal flow passage number counter of the link 3 between the observation point B and the relay node R2 by 1, and goes back to S4 without registering a lower link of the link 3 due to the absence of a lower link of the link 3.

The link primary abnormality judging section 42 judges that no yet-to-be-retrieved link is included in the passage path information extracted in S3, and goes back to S1. Subsequently, the link primary abnormality judging section 42 sequentially selects the observation flows AC, AD, and AE as a yet-to-be-retrieved observation flow, and performs processing in S2 to S7 in the same manner as for the observation flow AB.

When processing in S2 to S7 is performed on all the observation flows observed at the observation point A, the link primary abnormality judging section 42 proceeds to S8 after S1, judges whether each link is normal or abnormal in the manner described below based on the normal flow passage number counter and the abnormal flow passage number counter of each link, and makes the link primary abnormality judgment result DB 36 record the judgment result as the link primary abnormality judgment result.

The link primary abnormality judging section 42 judges a link whose normal flow passage number counter indicates 1 or more to be normal. The link primary abnormality judging section 42 judges a link whose normal flow passage number counter indicates 0 and abnormal flow passage number counter indicates 1 or more to be abnormal. Moreover, the link primary abnormality judging section 42 judges a link whose normal flow passage number counter and abnormal flow passage number counter indicate 0 to be a link that cannot be judged (a non-passage link).

After performing processing of the flow chart of FIG. 10 by using the observation point A as a starting point, the link primary abnormality judging section 42 makes the link primary abnormality judgment result DB 36 record the link primary abnormality judgment result shown in FIG. 11. FIG. 11 illustrates the result of the link primary abnormality judgment performed by using the observation point A as a starting point.

Moreover, after performing processing of the flow chart of FIG. 10 by using the observation point D as a starting point, the link primary abnormality judging section 42 makes the link primary abnormality judgment result DB 36 record the link primary abnormality judgment result shown in FIG. 12. FIG. 12 illustrates the result of the link primary abnormality judgment performed by using the observation point D as a starting point.

As described above, the link primary abnormality judging section 42 performs processing of the flow chart of FIG. 10 for each observation point. The link primary abnormality judging section 42 acquires the flow abnormality judgment result and the passage path information for each of the observation flows observed at one observation point, and, for each link extracted from the acquired passage path information, adds the normality/abnormality of the observation flow indicated by the acquired flow abnormality judgment result in the normal flow passage number counter/the abnormal flow passage number counter of the link primary abnormality judgment result.

As previously explained, in the case of the observation flow AB observed at the observation point A, the link primary abnormality judging section 42 acquires "abnormal" as the flow abnormality judgment result, acquires "the observation point A→the relay node R1→the relay node R2→the observation point B" as the passage path information, and increments the abnormal flow passage number counters of three links extracted from the passage path information by 1, the link 1 between the observation point A and the relay node R1, the link 2 between the relay nodes R1 and R2, and the link 3 between the observation point B and the relay node R2.

Similarly, in the case of the observation flow AC observed at the observation point A, the link primary abnormality judging section 42 acquires "normal" as the flow abnormality judgment result, acquires "the observation point A→the relay node R1→the relay node R2→the relay node R5→the observation point C" as the passage path information, and increments the normal flow passage number counters of four links extracted from the passage path information by 1, the link 1, the link 2, the link 5 between the relay nodes R2 and R5, and the link 8 between the observation point C and the relay node R5. Also in the case of the observation flows AD and AE observed at the observation point A, the link primary abnormality judging section 42 performs processing in a similar manner.

The link primary abnormality judging section 42 increments the normal flow passage number counter/the abnormal flow passage number counter for each link of all the observation flows observed at the observation point A. As the link primary abnormality judgment result, the link primary abnormality judging section 42 judges a link whose normal flow passage number counter indicates 1 or more to be normal, a link whose normal flow passage number counter indicates 0 and abnormal flow passage number counter indicates 1 or more to be abnormal, and judges a link whose normal flow passage number counter and abnormal flow passage number counter indicate 0 to be a link that cannot be judged (a non-passage link).

As a result, the link primary abnormality judging section 42 acquires the link primary abnormality judgment result shown in FIG. 11 as the link primary abnormality judgment result obtained by using the observation point A as a starting point. The logic itself of the link primary abnormality judgment processing performed by the link primary abnormality judging section 42 may be a judgment made in any other way than is described above. For example, it is also possible to judge a link to be normal if a threshold percentage or more of the observation flows passed therethrough is an observation flow whose flow abnormality judgment result is normal, and judge a link to be abnormal if less than a threshold percentage of the observation flows passed therethrough is an observation flow whose flow abnormality judgment result is normal.

This practical example counts the flow abnormality judgment results with no consideration given to a direction (up/down) with respect to each link; however, it is also possible to count the flow abnormality judgment results with consideration given to a direction. When the flow abnormality judgment results are counted with consideration given to a direction, the number of links to be dealt with is increased, but it is possible to perform processing in substantially the same manner as in this practical example.

(The Link Secondary Abnormality Judging Section 43 and the Link Secondary Abnormality Judgment Result DB 37)

Figure 13:
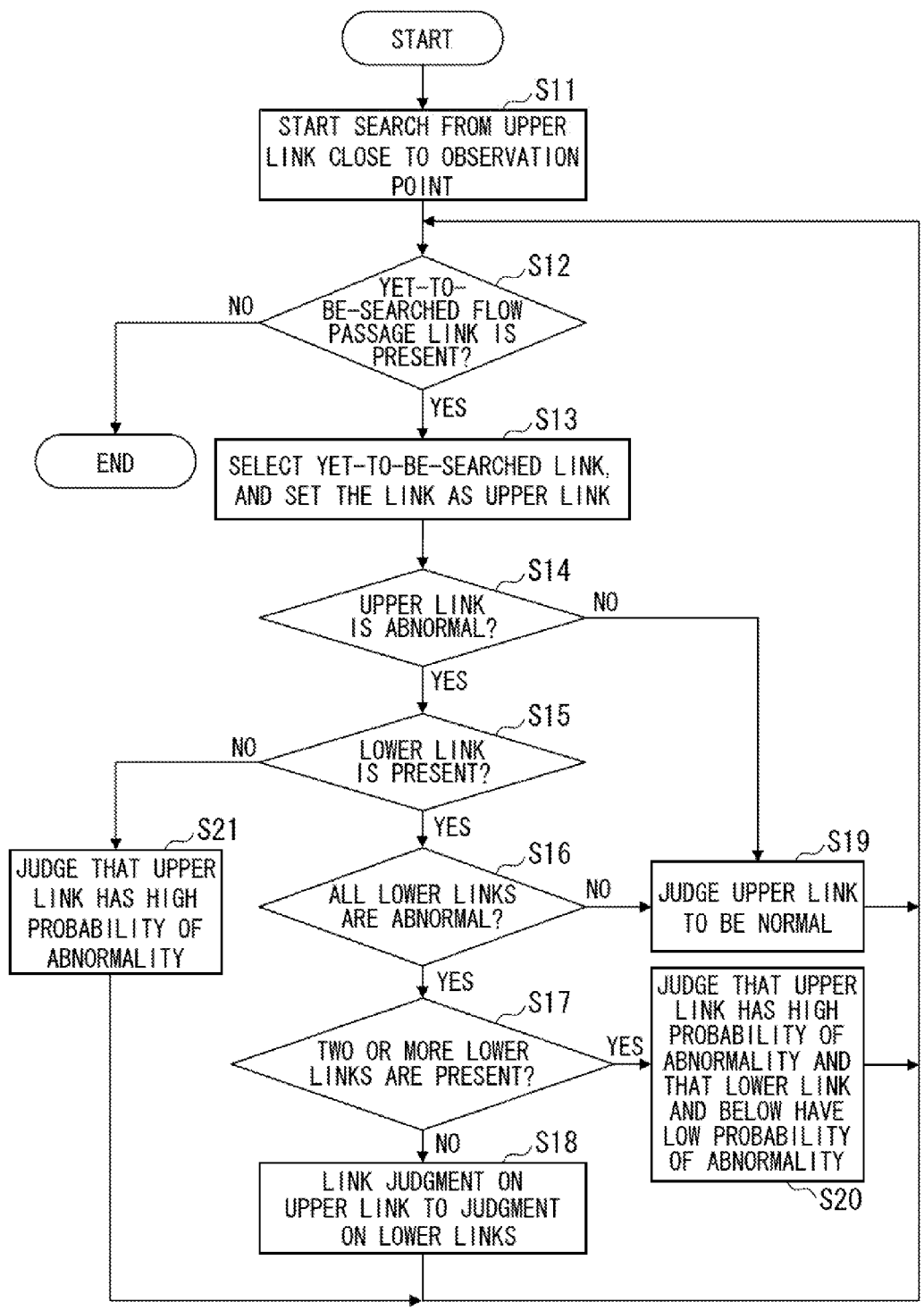
FIG. 13 is a flow chart of an example of processing performed by a link secondary abnormality judging section.

FIG. 13 is a flow chart of an example of processing performed by the link secondary abnormality judging section. The link secondary abnormality judging section 43 processes the flow chart of FIG. 13 for each of the link primary abnormality judgment results obtained by using the observation points A to E as a starting point. The flow chart of FIG. 13 makes analysis and judgment from a link close to each observation point, and, in each analysis and judgment, sequentially makes analysis and judgment of the probabilities of abnormality of links by using the link primary abnormality judgment results of the upper/lower links by setting a link close to the observation point as an upper link and the other links as lower links.

Figure 14:
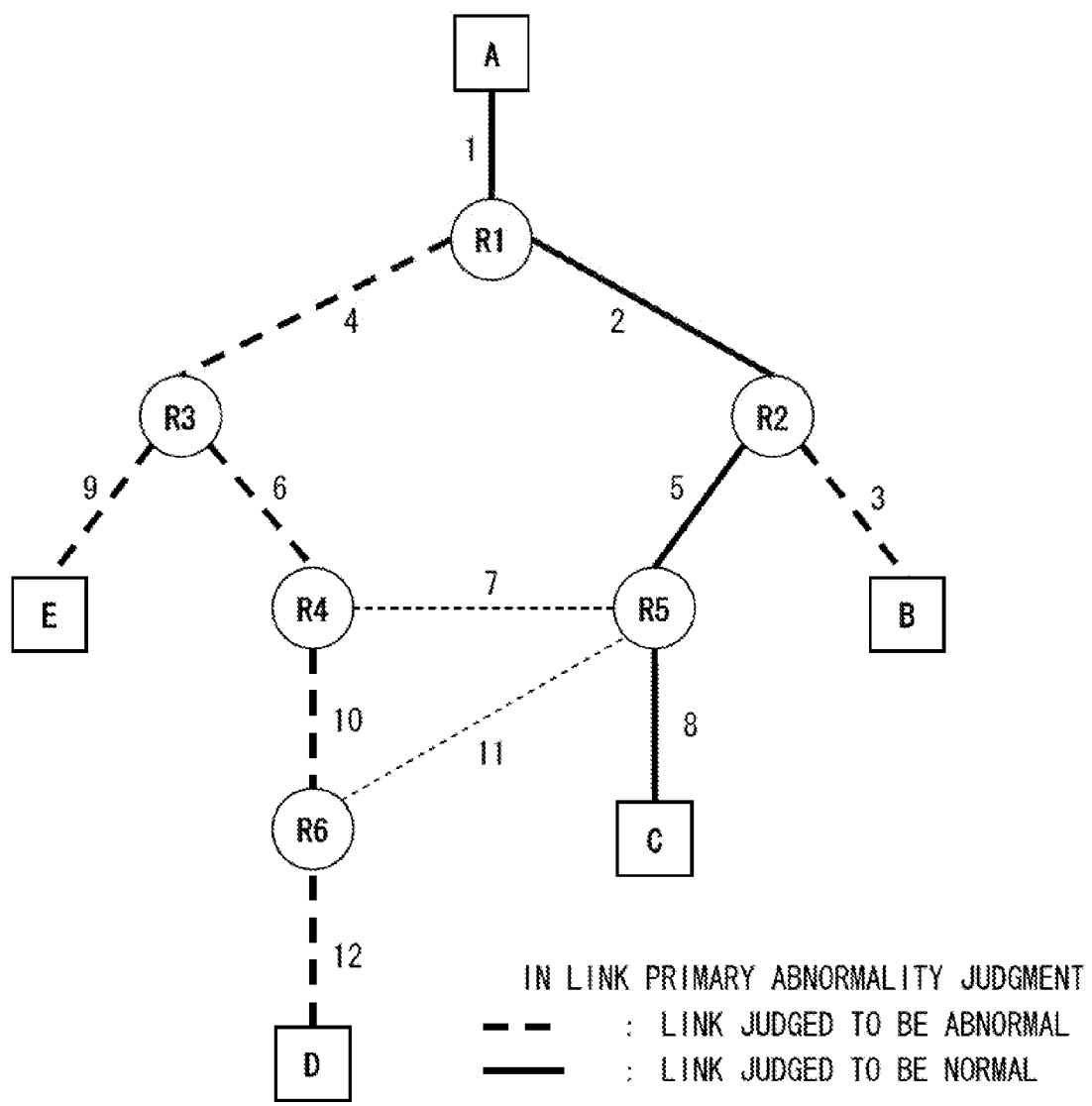
FIG. 14 illustrates an image of the result of a link primary abnormality judgment performed by using the observation point A as a starting point.

FIG. 14 illustrates an image of the result of the link primary abnormality judgment performed by using the observation point A as a starting point. The image diagram of FIG. 14 corresponds to the link primary abnormality judgment result of FIG. 11, the result obtained by using the observation point A as a starting point. In the image diagram of FIG. 14, the links 1, 2, 5, and 8 are links judged to be normal, the links 3, 4, 6, 9, 10, and 12 are links judged to be abnormal, and the links 7 and 11 are links judged to a link that cannot be judged (a non-passage link).

Here, processing of the flow chart of FIG. 13 will be described, taking up as an example the link primary abnormality judgment result shown in FIG. 14 and obtained by using the observation point A as a starting point. In the processing of the flow chart of FIG. 13, link secondary abnormality judgment processing of each link is performed by using the link primary abnormality judgment result.

The procedure proceeds to S11, and the link secondary abnormality judging section 43 starts a search from an upper link 1 close to the observation point A. The procedure proceeds to S12, and the link secondary abnormality judging section 43 judges that a link (an observation flow passage link) that is yet to be searched, the link through which an observation flow has passed, is present, and proceeds to S13. In S13, the link secondary abnormality judging section 43 selects a yet-to-be-searched link 1, and sets it as an upper link.

The procedure proceeds to S14, and the link secondary abnormality judging section 43 proceeds to S19 because the link primary abnormality judgment result of the upper link 1 is normal. In S19, the link secondary abnormality judging section 43 judges the upper link 1 to be normal, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 4, and sets it as an upper link.

The procedure proceeds to S14, and the link secondary abnormality judging section 43 proceeds to S15 because the link primary abnormality judgment result of the upper link 4 is abnormal. The link secondary abnormality judging section 43 proceeds to S16 because the upper link 4 has the lower links 6 and 9.

The link secondary abnormality judging section 43 examines the link primary abnormality judgment result about the lower links 6 and 9 of the upper link 4. Since the link primary abnormality judgment results of the lower links 6 and 9 are both abnormal, the link secondary abnormality judging section 43 judges all the lower links of the upper link 4 to be abnormal, and proceeds to S17.

The link secondary abnormality judging section 43 judges that two or more lower links are present, proceeds to S20, judges that the upper link 4 has a high probability of abnormality and that the links 6, 9, 10, and 12 which are the lower links and below of the upper link 4 have a low probability of abnormality, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 2, and sets it as an upper link.

The procedure proceeds to S14, and the link secondary abnormality judging section 43 proceeds to S19 because the link primary abnormality judgment result of the upper link 2 is normal. In S19, the link secondary abnormality judging section 43 judges the upper link 2 to be normal, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 5, and sets it as an upper link.

The procedure proceeds to S14, and the link secondary abnormality judging section 43 proceeds to S19 because the link primary abnormality judgment result of the upper link 5 is normal. In S19, the link secondary abnormality judging section 43 judges the upper link 5 to be normal, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 8, and sets it as an upper link.

The procedure proceeds to S14, and the link secondary abnormality judging section 43 proceeds to S19 because the link primary abnormality judgment result of the upper link 8 is normal. In S19, the link secondary abnormality judging section 43 judges the upper link 8 to be normal, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 3, and sets it as an upper link.

The procedure proceeds to S14, and the link secondary abnormality judging section 43 proceeds to S15 because the link primary abnormality judgment result of the upper link 3 is abnormal. Since the upper link 3 has no lower link, the link secondary abnormality judging section 43 proceeds to S21, judges that the upper link 3 has a high probability of abnormality, and goes back to S12.

The link secondary abnormality judging section 43 judges that a yet-to-be-searched observation flow passage link is not present, and ends the link secondary abnormality judgment processing shown in FIG. 13. Incidentally, the link secondary abnormality judging section 43 cannot judge the probability of abnormality of the links that cannot be diagnosed (non-passage links) 7 and 11, and therefore, also in the link secondary abnormality judgment result, these links are treated as a link that cannot be judged (a non-passage link).

After performing processing of the flow chart of FIG. 13 by using the observation point A as a starting point, the link secondary abnormality judging section 43 makes the link secondary abnormality judgment result DB 37 store the link secondary abnormality judgment result shown in FIG. 15. FIG. 15 illustrates the result of the link secondary abnormality judgment performed by using the observation point A as a starting point.

Figure 16:
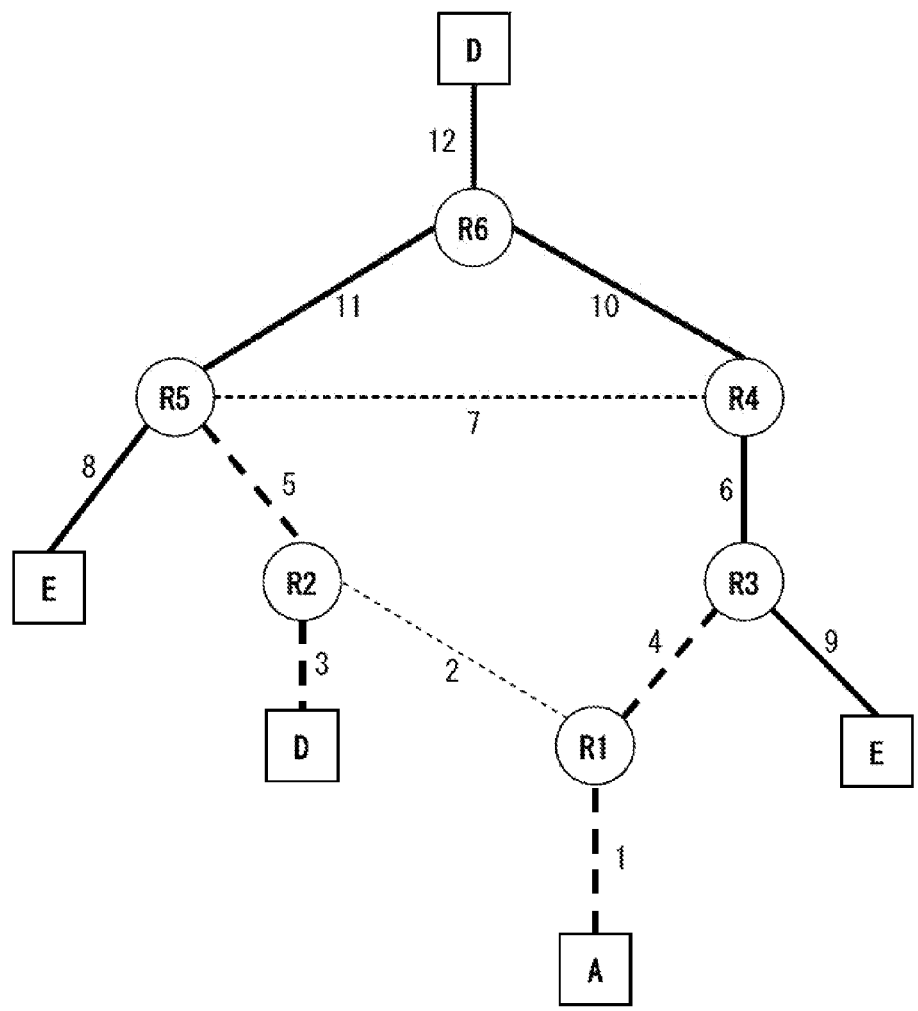
FIG. 16 illustrates an image of the result of a link primary abnormality judgment performed by using the observation point D as a starting point.

Next, processing of the flow chart of FIG. 13 will be described, taking up as an example the result of the link primary abnormality judgment shown in FIG. 16 and performed by using the observation point D as a starting point.

The procedure proceeds to S11, and the link secondary abnormality judging section 43 starts a search from an upper link 12 close to the observation point D. The procedure proceeds to S12, and the link secondary abnormality judging section 43 judges that a yet-to-be-searched observation flow passage link is present, and proceeds to S13. In S13, the link secondary abnormality judging section 43 selects a yet-to-be-searched link 12, and sets it as an upper link.

The procedure proceeds to S14, and the link secondary abnormality judging section 43 proceeds to S19 because the link primary abnormality judgment result of the upper link 12 is normal, judges the upper link 12 to be normal, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 11, and sets it as an upper link.

The procedure proceeds to S14, and the link secondary abnormality judging section 43 proceeds to S19 because the link primary abnormality judgment result of the upper link 11 is normal, judges the upper link 11 to be normal, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 8, and sets it as an upper link.

The procedure proceeds to S14, and the link secondary abnormality judging section 43 proceeds to S19 because the link primary abnormality judgment result of the upper link 8 is normal, judges the upper link 8 to be normal, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 5, and sets it as an upper link.

The procedure proceeds to S14, and the link secondary abnormality judging section 43 proceeds to S15 because the link primary abnormality judgment result of the upper link 5 is abnormal. Since the upper link 5 has a lower link 3, the link secondary abnormality judging section 43 proceeds to S16.

The link secondary abnormality judging section 43 examines the link primary abnormality judgment result about the lower link 3 of the upper link 5. Since the link primary abnormality judgment result of the lower link 3 is abnormal, the link secondary abnormality judging section 43 judges that all the lower links of the upper link 5 are abnormal, and proceeds to S17.

The link secondary abnormality judging section 43 judges that two or more lower links are not present, proceeds to S18, links the judgment of the probability of abnormality of the upper link 5 to the judgment of the probability of abnormality of the lower link 3, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 3, and sets it as an upper link.

The procedure proceeds to S14, and the link secondary abnormality judging section 43 proceeds to S15 because the link primary abnormality judgment result of the upper link 3 is abnormal. Since the upper link 3 has no lower link, the link secondary abnormality judging section 43 proceeds to S21, judges that the upper link 3 has a high probability of abnormality, and goes back to S12. Incidentally, as a result of the upper link 3 having been judged to have a high probability of abnormality, the link secondary abnormality judging section 43 determines the judgment of the probability of abnormality of the link 5, the judgment linked to the judgment of the probability of abnormality of the link 3, to be a high probability of abnormality.

The link secondary abnormality judging section 43 judges that a yet-to-be-searched observation flow passage link is present, and proceeds to S13. In S13, the link secondary abnormality judging section 43 selects a yet-to-be-searched link 10, and sets it as an upper link.

The procedure proceeds to S14, and the link secondary abnormality judging section 43 proceeds to S19 because the link primary abnormality judgment result of the upper link 10 is normal, judges the upper link 10 to be normal, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 6, and sets it as an upper link.

The procedure proceeds to S14, and the link secondary abnormality judging section 43 proceeds to S19 because the link primary abnormality judgment result of the upper link 6 is normal, judges the upper link 6 to be normal, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 4, and sets it as an upper link.

The procedure proceeds to S14, and the link secondary abnormality judging section 43 proceeds to S15 because the link primary abnormality judgment result of the upper link 4 is abnormal. Since the upper link 4 has a lower link 1, the link secondary abnormality judging section 43 proceeds to S16.

The link secondary abnormality judging section 43 examines the link primary abnormality judgment result about the lower link 1 of the upper link 4. Since the link primary abnormality judgment result of the lower link 1 is abnormal, the link secondary abnormality judging section 43 judges that all the lower links of the upper link 4 are abnormal, and proceeds to S17.

The link secondary abnormality judging section 43 judges that two or more lower links are not present, proceeds to S18, links the judgment of the probability of abnormality of the upper link 4 to the judgment of the probability of abnormality of the lower link 1, and goes back to S12.

The link secondary abnormality judging section 43 judges that a yet-to-be-searched observation flow passage link is present, and proceeds to S13. In S13, the link secondary abnormality judging section 43 selects a yet-to-be-searched link 1, and sets it as an upper link.

The procedure proceeds to S14, and the link secondary abnormality judging section 43 proceeds to S15 because the link primary abnormality judgment result of the upper link 1 is abnormal. Since the upper link 1 has no lower link, the link secondary abnormality judging section 43 proceeds to S21, judges that the upper link 1 has a high probability of abnormality, and goes back to S12. Incidentally, as a result of the upper link 1 having been judged to have a high probability of abnormality, the link secondary abnormality judging section 43 determines the judgment of the probability of abnormality of the link 4, the judgment linked to the judgment of the probability of abnormality of the link 1, to be a high probability of abnormality.

The link secondary abnormality judging section 43 judges that a yet-to-be-searched observation flow passage link is present, and proceeds to S13. In S13, the link secondary abnormality judging section 43 selects a yet-to-be-searched link 9, and sets it as an upper link.

The procedure proceeds to S14, and the link secondary abnormality judging section 43 proceeds to S19 because the link primary abnormality judgment result of the upper link 9 is normal, judges the upper link 9 to be normal, and goes back to S12.

The link secondary abnormality judging section 43 judges that a yet-to-be-searched observation flow passage link is not present, and ends the link secondary abnormality judgment processing shown in FIG. 13. Incidentally, the link secondary abnormality judging section 43 cannot judge the probability of abnormality of the links that cannot be diagnosed (non-passage links) 2 and 7, and therefore, also in the link secondary abnormality judgment result, these links are treated as a link that cannot be judged (a non-passage link).

After performing processing of the flow chart of FIG. 13 by using the observation point D as a starting point, the link secondary abnormality judging section 43 makes the link secondary abnormality judgment result DB 37 store the link secondary abnormality judgment result shown in FIG. 17. FIG. 17 illustrates the result of the link secondary abnormality judgment performed by using the observation point D as a starting point.

Although the above description deals with, as an example, the link secondary abnormality judgment processing performed by using the observation point A and the observation point D as a starting point, the same processing is performed on the observation point B, the observation point C, and the observation point E. The processing of the flow abnormality judging section 41, the link primary abnormality judging section 42, and the link secondary abnormality judging section 43 may be performed as distributed/parallel processing or serial processing.

(The Link Tertiary Abnormality Judging Section 44 and the Link Tertiary Abnormality Judgment Result DB 38)

Figure 18:
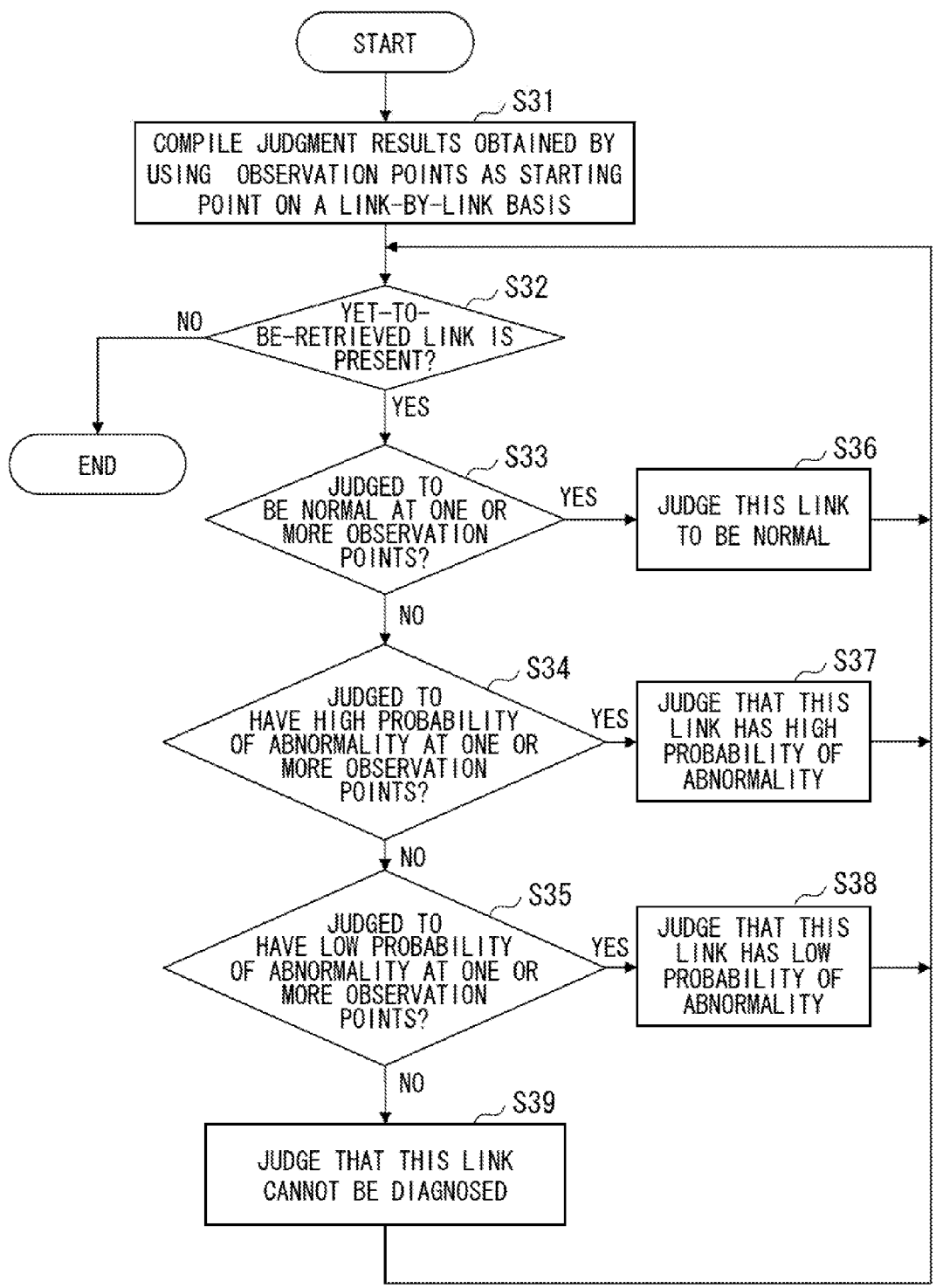
FIG. 18 is a flow chart of an example of processing performed by a link tertiary abnormality judging section.

FIG. 18 is a flow chart of an example of processing performed by the link tertiary abnormality judging section. The link tertiary abnormality judging section 44 makes a link tertiary abnormality judgment (a final judgment) for each link by acquiring and compiling the link secondary abnormality judgment results performed by using the observation points as a starting point.

Figure 19:
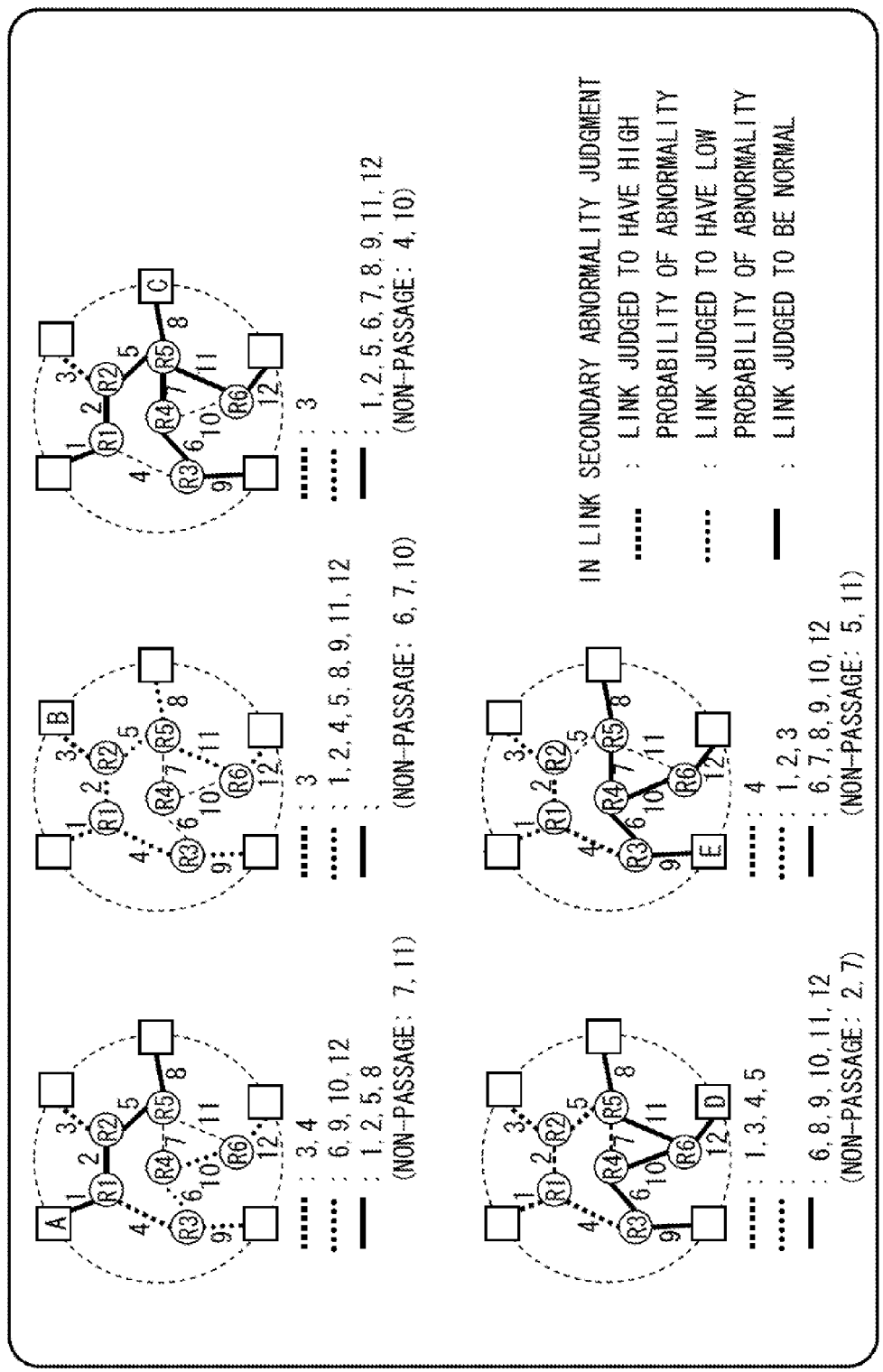
FIG. 19 illustrates an image of the result of a link secondary abnormality judgment performed by using each observation point as a starting point.

FIG. 19 illustrates an image of the results of the link secondary abnormality judgment performed by using the observation points as a starting point. The image diagram of FIG. 19 corresponds to the network shown in FIG. 1, and indicates the link secondary abnormality judgment results obtained by using the observation points A to E as a starting point.

Here, processing of the flow chart of FIG. 18 will be described, taking up as an example the link secondary abnormality judgment results shown in FIG. 19 and obtained by using the observation points A to E as a starting point. The procedure proceeds to S31, and the link tertiary abnormality judging section 44 compiles the link secondary abnormality judgment results obtained by using the observation points A to E as a starting point on a link-by-link basis.

FIG. 20 illustrates a process of the link tertiary abnormality judgment obtained by compiling the link secondary abnormality judgment results obtained by using the observation points A to E as a starting point on a link-by-link basis. The link tertiary abnormality judging section 44 proceeds to S32, and judges whether or not a yet-to-be-retrieved link is present. If a yet-to-be-retrieved link is found to be present, the link tertiary abnormality judging section 44 selects one link from the yet-to-be-retrieved links, and proceeds to S33.

Based on the compiled link secondary abnormality judgment results of the selected link, if the link is judged to be normal at one or more observation points, the link tertiary abnormality judging section 44 proceeds to S36, judges the link tertiary abnormality judgment result of the selected link to be normal, and goes back to S32.

Based on the compiled link secondary abnormality judgment results of the selected link, if the link is not judged to be normal at any of the observation points, the link tertiary abnormality judging section 44 proceeds to S34. Based on the compiled link secondary abnormality judgment results of the selected link, if the link is judged to have a high probability of abnormality at one or more observation points, the link tertiary abnormality judging section 44 proceeds to S37, judges the link tertiary abnormality judgment result of the selected link to be a high probability of abnormality, and goes back to S32.

Based on the compiled link secondary abnormality judgment results of the selected link, if the link is not judged to have a high probability of abnormality at any of the observation points, the link tertiary abnormality judging section 44 proceeds to S35. Based on the compiled link secondary abnormality judgment results of the selected link, if the link is judged to have a low probability of abnormality at one or more observation points, the link tertiary abnormality judging section 44 proceeds to S38, judges the link tertiary abnormality judgment result of the selected link to be a low probability of abnormality, and goes back to S32.

Based on the compiled link secondary abnormality judgment results of the selected link, if the link is not judged to have a low probability of abnormality at any of the observation points, the link tertiary abnormality judging section 44 proceeds to S39. The link tertiary abnormality judging section 44 judges the link tertiary abnormality judgment result of the selected link to be a link that cannot be diagnosed (a non-passage link), and goes back to S32. Incidentally, if the link tertiary abnormality judging section 44 judges in S32 that a yet-to-be-retrieved link is not present in the configuration diagram shown in FIG. 20, the link tertiary abnormality judging section 44 ends the processing of the flow chart of FIG. 18.

For example, in the case of the link tertiary abnormality judgment processing process shown in FIG. 20, as for the links 1, 2, and 5 to 12, since the link secondary abnormality judgment result at any of the observation points is judged to be normal, the link tertiary abnormality judgment results of the links 1, 2, and 5 to 12 are judged to be normal. Moreover, in the case of the link tertiary abnormality judgment processing process shown in FIG. 20, as for the links 3 and 4, since the link secondary abnormality judgment results are judged to be normal at none of the observation points and the link secondary abnormality judgment result at any one of the observation points is judged to be a high probability of abnormality, the link tertiary abnormality judgment results of the links 3 and 4 are judged to be a high probability of abnormality. The results accurately locate a point of abnormality that has occurred in the network of FIG. 1.

By performing processing of the flow chart of FIG. 18 by using the observation points A to E as a starting point, the link tertiary abnormality judging section 44 may acquire the link tertiary abnormality judgment result shown in FIG. 21 from the link tertiary abnormality judgment processing process shown in FIG. 20. The link tertiary abnormality judging section 44 makes the link tertiary abnormality judgment result DB 38 store the link tertiary abnormality judgment result. FIG. 21 illustrates the result of the link tertiary abnormality judgments obtained by using the observation points A to E as a starting point.

Moreover, FIG. 22 illustrates an image of the results of the link secondary abnormality judgment performed by using the observation points A and B as a starting point. The image of FIG. 22 indicates only the link secondary abnormality judgment results obtained by using the observation points A and B of the image of FIG. 19 as a starting point. Such an assumption applies to a case in which, for example, the link secondary abnormality judgment results using the observation points C to E as a starting point could not be obtained.

By performing processing of the flow chart of FIG. 18 by using the observation points A and B shown in FIG. 22 as a starting point, the link tertiary abnormality judging section 44 may acquire the link tertiary abnormality judgment result shown in FIG. 23. The link tertiary abnormality judging section 44 makes the link tertiary abnormality judgment result DB 38 store the link tertiary abnormality judgment result. FIG. 23 illustrates the result of the link tertiary abnormality judgment performed by using the observation points A and B as a starting point.

For example, in the case of the link tertiary abnormality judgment result shown in FIG. 23, as for the links 1, 2, 5, and 8, since the link secondary abnormality judgment result at any of the observation points is judged to be normal, the link tertiary abnormality judgment results of the links 1, 2, 5, and 8 are judged to be normal. Moreover, in the case of the link tertiary abnormality judgment result shown in FIG. 23, as for the links 3 and 4, since the link secondary abnormality judgment result is judged to be normal at none of the observation points and the link secondary abnormality judgment result at any of the observation points is judged to be a high probability of abnormality, the link tertiary abnormality judgment results of the links 3 and 4 are judged to be a high probability of abnormality.

Moreover, in the case of the link tertiary abnormality judgment result shown in FIG. 23, as for the links 6, 9, and 10 to 12, since the link secondary abnormality judgment results are judged to be normal and a high probability of abnormality at none of the observation points and the link secondary abnormality judgment result at any one of the observation points is judged to be a low probability of abnormality, the link tertiary abnormality judgment results of the link 6, 9, and 10 to 12 are judged to be a low probability of abnormality. Furthermore, in the case of the link tertiary abnormality judgment result shown in FIG. 23, as for the link 7, since the link secondary abnormality judgment result is judged to be normal, a high probability of abnormality, and a low probability of abnormality at none of the observation points, the link is judged to be a link that cannot be judged.

As described above, when the number of link secondary abnormality judgment results to be compiled is small, the link tertiary abnormality judgment result may include a link that is judged to be a link having a low probability of abnormality or a link that cannot be judged. In general, when a sufficient number of link secondary abnormality judgment results are compiled, a link that is judged to be a link having a low probability of abnormality or a link that cannot be judged does not exist. Therefore, when a link that is judged to be a link having a low probability of abnormality or a link that cannot be judged remains, it may be pointed out that there may be a shortage of information for locating an abnormal point. Moreover, as shown in FIG. 22, even when the number of link secondary abnormality judgment results to be compiled is small, the combined result of a high probability of abnormality and a low probability of abnormality includes an abnormal link without fail, making it possible to make a diagnosis in such a way that no abnormal link is undetected.

Practical Example 2

Figure 24:
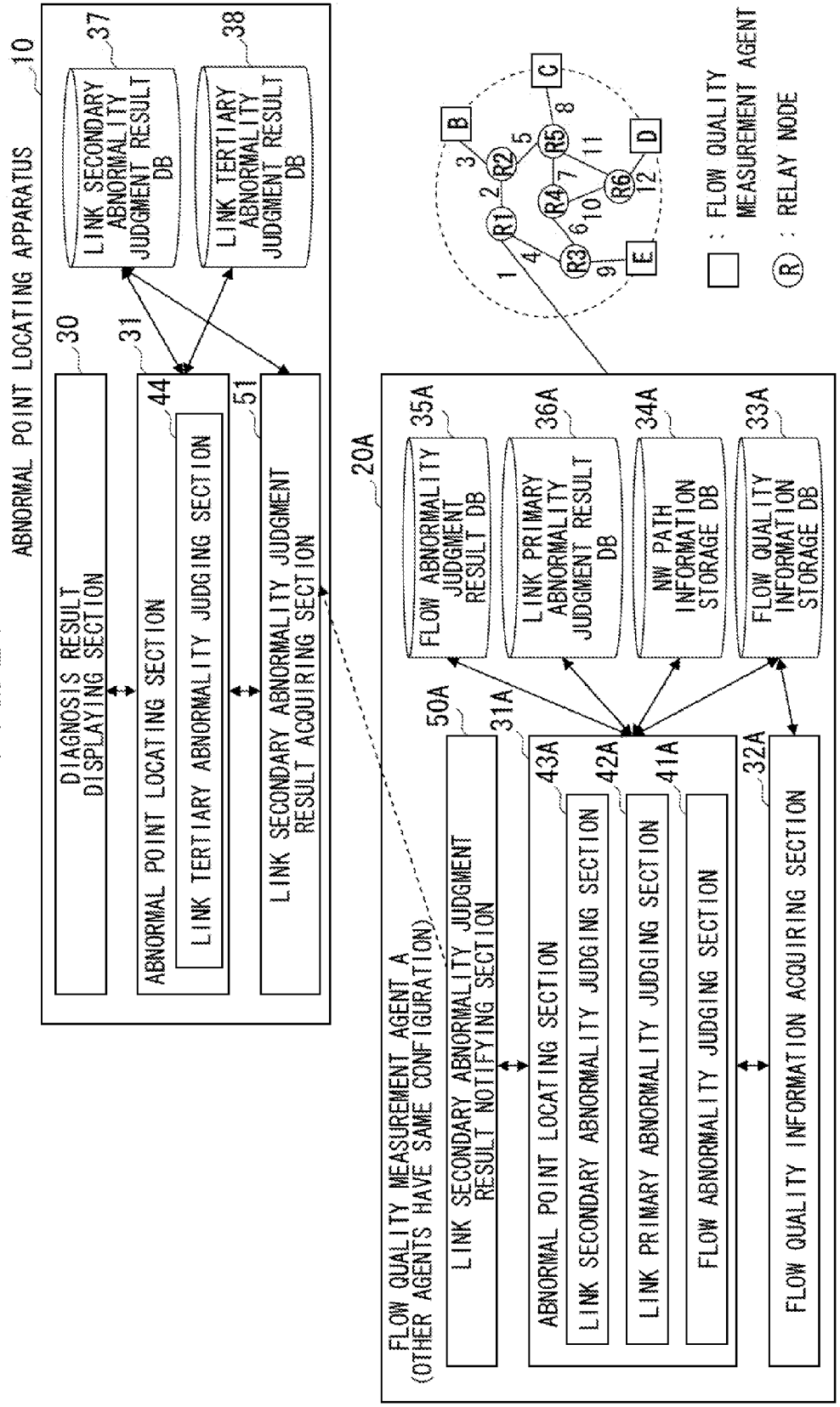
FIG. 24 is a block diagram of another example of processing performed by the abnormal point locating apparatus.

FIG. 24 is a block diagram of another example of processing of the abnormal point locating apparatus. An abnormal point locating apparatus 10 of FIG. 24 equips each flow quality measurement agent 20 with the flow quality information acquiring section 32, the flow quality information storage DB 33, the NW path information storage DB 34, the flow abnormality judgment result DB 35, the link primary abnormality judgment result DB 36, the flow abnormality judging section 41, the link primary abnormality judging section 42, and the link secondary abnormality judging section 43 of the abnormal point locating apparatus 10 of FIG. 6.

Moreover, each flow quality measurement agent 20 includes a link secondary abnormality judgment result notifying section 50 notifying the abnormal point locating apparatus 10 of the link secondary abnormality judgment result. The abnormal point locating apparatus 10 includes a link secondary abnormality judgment result acquiring section 51 acquiring the link secondary abnormality judgment result from each flow quality measurement agent 20.

The processing block diagram of FIG. 24 is an embodiment in which the abnormal point locating section 31 of FIG. 6 is distributed over the flow quality measurement agents 20. In the processing block diagram of FIG. 24, each flow quality measurement agent 20 performs processing until link secondary abnormality judgment processing using an observation point of its own as a starting point is completed. Then, the abnormal point locating apparatus 10 collects the link secondary abnormality judgment results judged by the flow quality measurement agents 20 at the observation points, and performs link tertiary abnormality judgment processing.

It is to be noted that the processing itself in the processing block diagram of FIG. 24 is substantially the same as the processing in the processing block diagram of FIG. 6. With the configuration of the processing block diagram of FIG. 24, since distributed/parallel processing is performed until the link secondary abnormality judgment processing is completed, it is possible to realize higher-speed processing.

As described above, the abnormal point locating apparatus 10 of this practical example may locate an abnormal point of the network while reducing a processing load by using the flow quality information observed at a plurality of observation points. Moreover, the abnormal point locating apparatus 10 of this practical example may locate an abnormal point of the network at higher speed by performing distributed/parallel processing. As a result, the abnormal point locating apparatus 10 of this practical example may locate an abnormal point of the network quickly and accurately.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present inventions has been described in detail, it should be understood that the various changes, substitutions, and alterations could be made hereto without departing from the spirit and scope of the invention.

What is claimed is:

1. A non-transitory computer-readable recording medium storing an abnormal point locating program allowing a computer to execute:
    acquiring information on a link through which observation flow passes,
    locating a link through which the observation flow passes, on an observation point-by-observation point basis,
    first judging whether the located link is normal or abnormal based on whether the observation flow is normal or abnormal when the observation flow is observed on a basis of an observation point; and
    second judging a probability of abnormality of a link on an observation point-by-observation point basis based on a result obtained by the first judging by using a tree-shaped upper/lower link connection relationship as seen from each observation point.

2. The computer-readable storage medium according to claim 1, further comprising a sixth judging to judge a probability of abnormality of a link by compiling results obtained by the second judging on an observation point-by-observation point basis.

3. The computer-readable storage medium according to claim 2,
    further comprising:
    compiling link secondary abnormality judgment results obtained by the second judging on an observation point-by-observation point basis,
    seventh judging a link judged to be normal at one or more observation points to be normal,
    eighth judging that a link which is not judged to be normal at one or more observation points and is judged to have a high probability of abnormality at one or more observation points has a high probability of abnormality, and
    ninth judging that a link which is not judged to be normal and have a high probability of abnormality at one or more observation points and is judged to have a low probability of abnormality at one or more observation points has a low probability of abnormality.

4. The computer-readable recording medium according to claim 1, wherein the link comprises a plurality of observation points.

5. The computer-readable recording medium according to claim 4, wherein the locating locates the link through which the observation flow passes by observing the link at one of the plurality of observation points.

6. The computer-readable storage medium according to claim 1, further comprising:
    sequentially selecting one of links on which a judgment of a probability of abnormality is not made and set the link as an upper link based on a tree-shaped upper/lower link connection relationship as seen from each observation point,
    third judging the upper link to be normal when the result of the upper link obtained by the first judging is normal,
    fourth judging the upper link to be normal when the result of the upper link obtained by the first judging is abnormal and one or more lower links whose results obtained by the first judging are normal are present,
    fifth judging that the upper link has a high probability of abnormality and that lower links and below have a low probability of abnormality when the result of the upper link obtained by the first judging is abnormal, two or more lower links are present, and the results of all the lower links obtained by the link first judging are abnormal, and
    setting a judgment of a probability of abnormality of the upper link to be linked to a judgment of a probability of abnormality of a lower link when the result of the upper link obtained by the first judging is abnormal, one lower link is present, and the result of the lower link obtained by the first judging is abnormal.

7. The computer-readable storage medium according to claim 1,
    further comprising:
    acquiring, from a flow quality information storing unit storing quality information on an observation flow, quality information on each observation flow and judging whether each observation flow is normal or abnormal based on the acquired quality information.

8. An abnormal point locating apparatus for locating an abnormal point of a network, the apparatus comprising:

a memory which stores a program; and a processor which executes, based on the program, a procedure comprising:

acquiring information on a link through which observation flow passes;

locating a link through which the observation flow passes, on an observation point-by-observation point basis, and first judging whether the located link is normal or abnormal based on whether the observation flow is normal or abnormal when the observation flow is observed on a basis of an observation point; and second judging that judges a probability of abnormality of a link on an observation point-by-observation point basis based on a result obtained by the first judging by using a tree-shaped upper/lower link connection relationship as seen from each observation point.

9. The abnormal point locating apparatus according to claim 8, wherein the link comprises a plurality of observation points.

10. The abnormal point locating apparatus according to claim 9, wherein the locating locates the link through which the observation flow passes by observing the link at one of the plurality of observation points.

11. The abnormal point locating apparatus according to claim 8, further comprising third judging that judges a probability of abnormality of a link by compiling results obtained by the second judging on an observation point-by-observation point basis.

12. An abnormal point locating system in which a plurality of flow quality measurement agents and an abnormal point locating apparatus are connected in such a way that data communication therebetween is possible, the flow quality measurement agents each include:

a memory which stores a program; and a processor which executes, based on the program, a procedure comprising:

acquiring information on a link through which observation flow passes, locating a link through which the observation flow passes, on an observation point-by-observation point basis, and first judging whether the located link is normal or abnormal based on whether the observation flow is normal or abnormal when the observation flow is observed on a basis of an observation point;

second judging to judge a probability of abnormality of a link based on a result obtained by the first judging by using a tree-shaped upper/lower link connection relationship as seen from an observation point; and notifying the abnormal point locating apparatus based on a result obtained by the second judging, acquiring the result obtained by the second judging from each flow quality measurement agents.

13. The abnormal point locating system according to claim 12, wherein the link comprises a plurality of observation points.

14. The abnormal point locating system according to claim 13, wherein the locating locates the link through which the observation flow passes by observing the link at one of the plurality of observation points.

15. An abnormal point locating system according to claim 12, further comprising:

compiling the results obtained by the second judging on an observation point-by-observation point basis; and third judging a probability of abnormality of a link, and the abnormal point locating apparatus locates an abnormal point of a network.

16. An abnormal point locating method locating an abnormal point of a network, the method comprising:

acquiring, from a network path information storing unit storing information on a passage path through which an observation flow passes, information on a link through which each observation flow passes, locating a link through which the observation flow passes, on an observation point-by-observation point basis, and first judging whether the located link is normal or abnormal based on whether the observation flow is normal or abnormal when the observation flow is observed on a basis of an observation point; and second judging that judges a probability of abnormality of a link on an observation point-by-observation point basis based on a result obtained by the first judging by using a tree-shaped upper/lower link connection relationship as seen from each observation point.

17. The abnormal point locating method according to claim 16, further comprising third judging that judges a probability of abnormality of a link by compiling results obtained by the second judging on an observation point-by-observation point basis.

* * * * *